United States Patent
Kempf et al.

(10) Patent No.: US 12,354,231 B2
(45) Date of Patent: Jul. 8, 2025

(54) METHODS AND APPARATUS TO WARP IMAGES WITH DECIMATION AND INTERPOLATION

(71) Applicant: Texas Instruments Incorporated, Dallas, TX (US)

(72) Inventors: Jeffrey Kempf, Dallas, TX (US); Matthew C. Stroud, Allen, TX (US); John Fenske, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 51 days.

(21) Appl. No.: 17/589,326

(22) Filed: Jan. 31, 2022

(65) Prior Publication Data
US 2023/0245265 A1   Aug. 3, 2023

(51) Int. Cl.
| | |
|---|---|
| G06T 3/18 | (2024.01) |
| G06F 18/22 | (2023.01) |
| G06T 1/20 | (2006.01) |
| G06T 1/60 | (2006.01) |
| G06T 3/4007 | (2024.01) |
| G06T 7/10 | (2017.01) |
| G06T 11/00 | (2006.01) |
| G09G 3/00 | (2006.01) |

(52) U.S. Cl.
CPC ............... *G06T 3/18* (2024.01); *G06F 18/22* (2023.01); *G06T 1/20* (2013.01); *G06T 1/60* (2013.01); *G06T 3/4007* (2013.01); *G06T 7/10* (2017.01); *G06T 11/00* (2013.01); *G09G 3/002* (2013.01); *G06T 2200/28* (2013.01); *G06T 2207/10016* (2013.01); *G06T 2207/20021* (2013.01); *G06T 2207/20068* (2013.01)

(58) Field of Classification Search
CPC .... G06T 3/18; G06T 7/10; G06T 1/20; G06T 1/60; G06T 3/4007; G06T 11/00; G06T 2200/28; G06T 2207/10016; G06T 2207/20021; G06T 2207/20068; G06F 18/22; G09G 3/002
See application file for complete search history.

(56) References Cited

U.S. PATENT DOCUMENTS

| | | | |
|---|---|---|---|
| 2002/0106026 A1* | 8/2002 | Demmer | G06T 3/4007 348/E7.012 |
| 2004/0213467 A1* | 10/2004 | Tanaka | H04N 7/0125 382/233 |
| 2006/0204125 A1* | 9/2006 | Kempf | H04N 9/3185 353/69 |
| 2009/0295818 A1* | 12/2009 | Jin | G06T 3/047 345/581 |

(Continued)

*Primary Examiner* — Yu Chen
(74) *Attorney, Agent, or Firm* — Michelle F. Murray; Frank D. Cimino

(57) ABSTRACT

Methods, apparatus, systems, and articles of manufacture are disclosed to warp images for video processing. An example device includes horizontal warper circuitry configured to access an input image, decimate a first set of pixels in the input image by row, and interpolate a second set of pixels in the input image by row to produce a horizontally warped image. The example device further includes vertical warper circuitry configured to access the horizontally warped image, decimate a first set of pixels in the horizontally warped image by column, and interpolate a second set of pixels in the horizontally warped image by column to produce an output image.

18 Claims, 14 Drawing Sheets

(56) References Cited

U.S. PATENT DOCUMENTS

| | | | | |
|---|---|---|---|---|
| 2010/0315556 | A1* | 12/2010 | Lin | G06T 3/4092 |
| | | | | 348/581 |
| 2011/0102465 | A1* | 5/2011 | Cho | G06T 3/40 |
| | | | | 345/657 |
| 2015/0379666 | A1* | 12/2015 | Redzic | G06T 3/4007 |
| | | | | 345/646 |
| 2017/0347044 | A1* | 11/2017 | Douady-Pleven | H04N 19/503 |
| 2018/0136720 | A1* | 5/2018 | Spitzer | G06T 3/40 |
| 2018/0315170 | A1* | 11/2018 | Mills | G06T 1/60 |
| 2020/0334787 | A1* | 10/2020 | Smirnov | G06T 3/4023 |

* cited by examiner

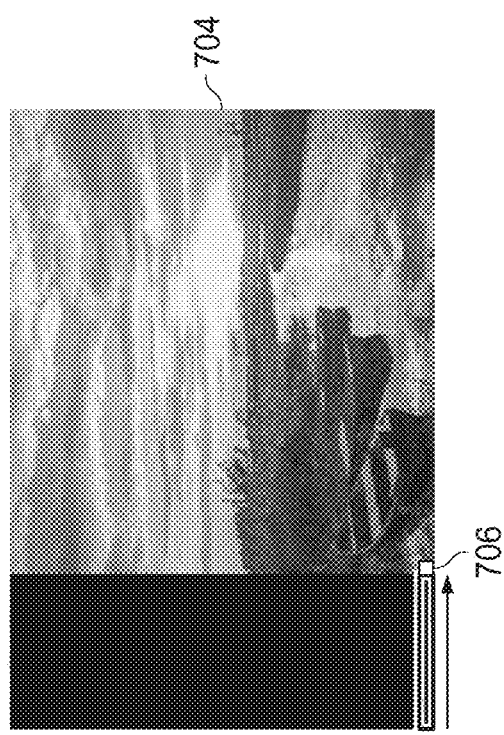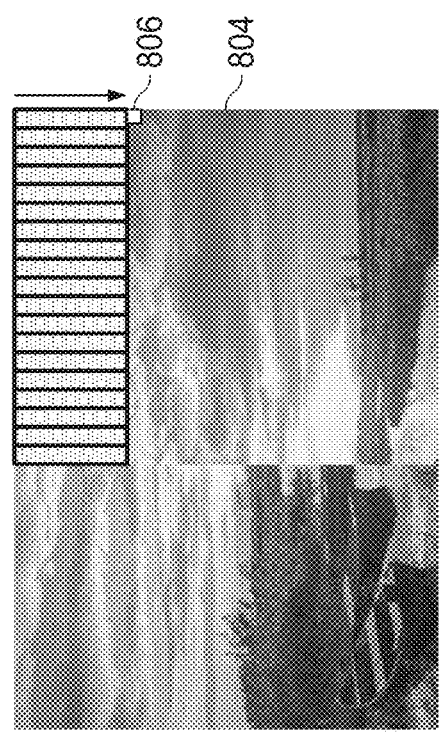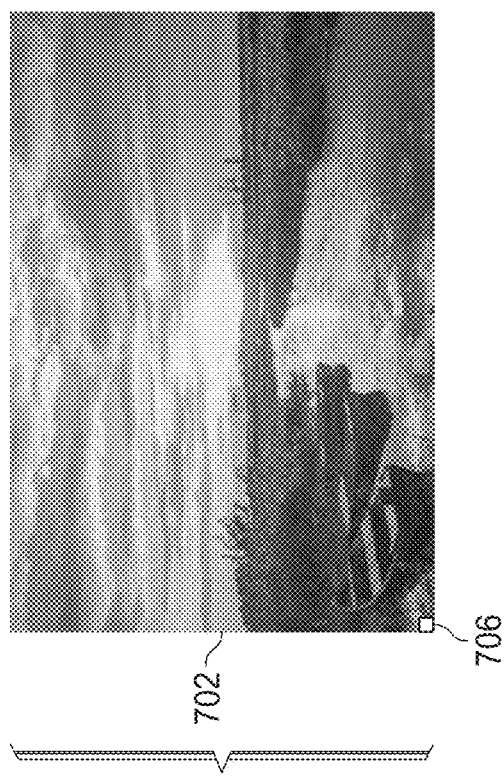
FIG. 7
FIG. 8

FIG. 10

METHODS AND APPARATUS TO WARP IMAGES WITH DECIMATION AND INTERPOLATION

FIELD OF THE DISCLOSURE

This disclosure relates generally to image processing, and, more particularly, to methods and apparatus to warp images for video processing.

BACKGROUND

A warped image is the output of a process that changes the pixel coordinates of an input image. In recent years, technologies which utilizing warped images have grown. Warped images are used in a variety of applications, including but not limited to projectors, augmented reality (AR) headsets, and virtual reality (VR) headsets.

SUMMARY

Methods, apparatus, systems, and articles of manufacture are disclosed to warp images for video processing. An example device includes horizontal warper circuitry configured to access an input image, decimate a first set of pixels in the input image by row, and interpolate a second set of pixels in the input image by row to produce a horizontally warped image. The example device further includes vertical warper circuitry configured to access the horizontally warped image, decimate a first set of pixels in the horizontally warped image by column, and interpolate a second set of pixels in the horizontally warped image by column to produce an output image.

BRIEF DESCRIPTION OF THE DRAWINGS

FIG. 7 is an illustrative example of horizontal warping.

FIG. 8 is a first illustrative example of vertical warping.

FIG. 10 is an illustrative example of foveated rendering.

DETAILED DESCRIPTION

Figure 1:
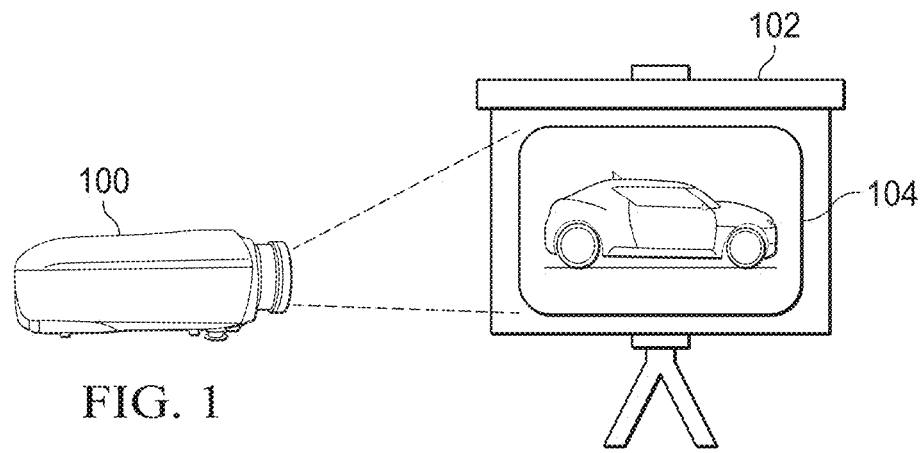
FIG. 1 is an example system to project video.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

A warped image is the output of a process that changes the pixel coordinates of an input image. In some examples, changing pixel coordinates may be referred to as moving pixels. Warped images have several applications. For example, some projectors may display warped images as a way of correcting for the keystone effect. The keystone effect is the distortion of an image caused by projecting the image onto an angled surface.

In another example, some projectors may require warped images to perform geometric correction. Geometric correction is the process of transforming the X and Y dimensions of an input image to match a specific surface or shape.

In another example, some applications may require warped images to stack or blend multiple images together. Image stacking and blending combines multiple images together to achieve a goal. Example goals include but are not limited to producing an output image with a greater depth of field than any input image and correcting for chromatic aberrations.

In another example, warped images are used in AR and VR headsets to produce foveated renderings. An image with foveated rendering has higher resolution in the center of the image, which is in the main portion of a user's vision, and lower resolution along the edges of the image, which is in the user's peripheral vision. As used herein, resolution refers to an amount of pixels that are present within an area of an image. Foveated renderings may be used to reduce a rendering workload of an AR or VR headset.

Examples disclosed herein describe warper circuitry. Example warper circuitry includes example horizontal warper circuitry to warp an input image horizontally, and example vertical warper circuitry to warp an input vertically. The transition between the example horizontal warp operations and example vertical warp operations requires a partial frame of memory. The example horizontal warper circuitry includes separate horizontal decimator circuitry and horizontal interpolator circuitry. Similarly, the example vertical warper circuitry includes separate vertical decimator circuitry and vertical interpolator circuitry. The usage of partial frame memory and separate decimator and interpolator operations to reduce or mitigate latency delay allow for example warper circuitry to warp images more efficiently than previous solutions.

FIG. 1 is an example system to project video. FIG. 1 includes a projector 100, an angled surface 102, and a projected image 104. The projector 100 is a device capable of displaying the projected image 104 onto a surface 102. The projector determines the projected image 104 based on an input image that may be stored in memory or provided to the projector by an external device. In some examples, the input image and projected image 104 is a frame of a video. In some examples, displaying the projected image 104 on a surface may be referred to as projection.

The projected image 104 of FIG. 1 may experience distortion when viewed on the angled surface 204 (i.e., the keystone effect). To correct for this distortion, the projector 100 may be implemented with image warping functionality. Examples described herein describe warper circuitry to horizontally warp and vertically warp an input image to produce a warped projected image 104. In some examples, the projected image 104 is warped in a manner that negates or cancels the distortion experienced by the keystone effect. As a result, the aspect ratio and resolution of the projected image 104 may match that of the input image.

Figure 2:
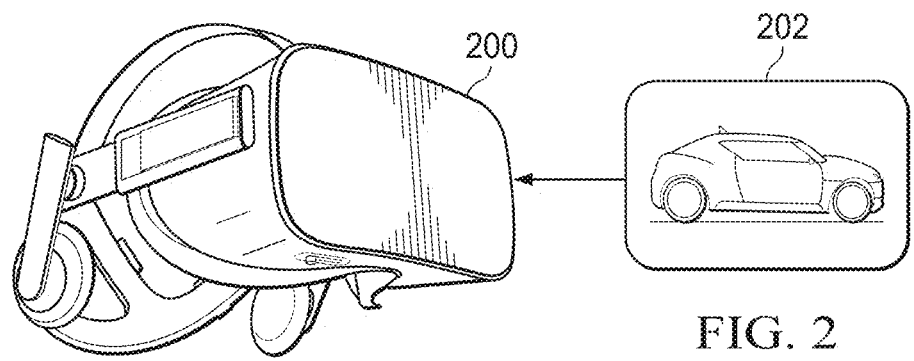
FIG. 2 is an example of a Virtual Reality (VR) headset.

FIG. 2 is an example of a Virtual Reality (VR) headset. FIG. 2 includes a VR headset 200 and an image 202. The VR headset 200 displays the image 202 for a user to view. In some examples, warper circuitry may warp an input image such that the image 202 is a foveated rendering prior to providing the image 202 to the VR headset 200. In such examples, the foveated image 202 reduces the computational cost associated with transmitting the image 202 to the VR headset 200 and displaying the image 202.

Figure 3:
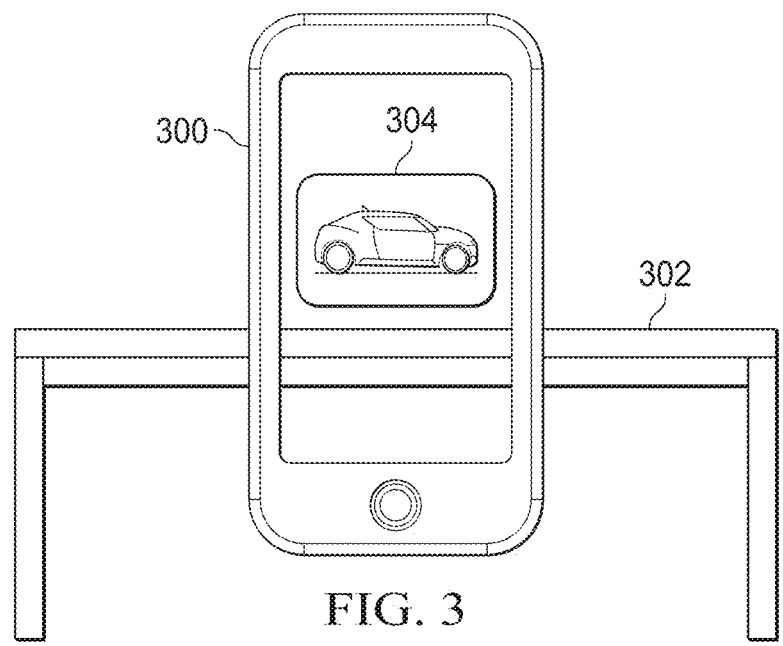
FIG. 3 is an example of Augmented Reality (AR).

FIG. 3 is an example of AR. FIG. 3 includes a projecting device 300, a physical environment 302, and an image 304. The projecting device 300 is any device capable of displaying an image in a physical environment.

Examples of the projecting device 300 include, but are not limited to, a smart phone, a tablet, internet enabled glasses, or a headset. In some examples, the projecting device 300 uses a camera to capture the physical environment 302. In such examples, the projecting device displays a rendering of the image 304 within the physical environment 302 on a screen. In other examples, the projecting device 300 displays the image 304 on a transparent surface, which allows a user to view both the image 304 and the physical environment 302 concurrently.

In some examples, warp map circuitry may warp an input image such that the image 304 is a foveated rendering prior to providing the image 304 to the projecting device 300. In such examples, the foveated image 304 reduces the computational cost associated with transmitting the image 304 to the projecting device 300 and displaying the image 304.

Figure 4:
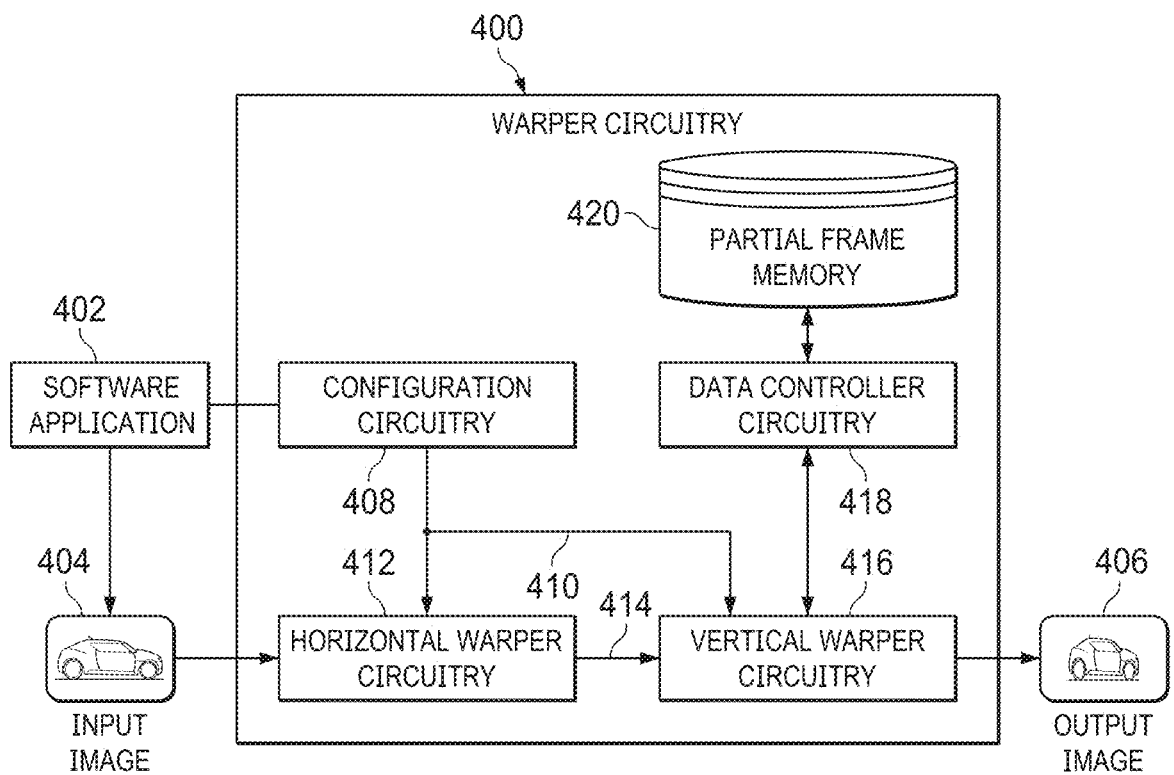
FIG. 4 is a block diagram of an example implementation of warper circuitry.

FIG. 4 is a block diagram of an example implementation of warper circuitry. FIG. 4 includes example warper circuitry 400, a software application 402, an input image 404, and an output image 406. The example warper circuitry 400 includes example configuration circuitry 408, example horizontal warper circuitry 412, an example horizontally warped image 414, example vertical warper circuitry 416, example data controller circuitry 418, and example partial frame memory 420.

The software application 402 of FIG. 4 is any software application that requires an image to be warped. The software application 402 provides the input image 404. The input image 404 may be stored in any image file format and requires both horizontal and vertical warping. The software application 402 also provides configuration data that describe how the input image 404 should be warped. The configuration data may include one or more parameters or data structures.

The example configuration circuitry 408 of FIG. 4 receives the configuration data and uses it to determine a sparse warp map 410. A warp map is a data structure that describes how regions of the input image 404 relates to corresponding regions of the output image 406. For example, the example configuration circuitry 408 partitions into the image into a grid of rectangles that compose the input image 404. In some examples, the grid is composed of 32 rows and 18 columns of rectangles. In such examples, the dimensions of each rectangle is a number of pixels equal to a power of two. In other examples, the grid of rectangles has different dimensions. Data stored in the warp map describes how each rectangle from the input image 404 is transformed into an arbitrary quadrilateral in the output image 406. The quadrilateral is arbitrary because it may be any shape that has four sides. As used herein, an input rectangle refers to one of the rectangle regions that compose the input image 404. Similarly, an output quadrilateral refers to one of the quadrilateral regions that compose the output image 406.

The example configuration circuitry 408 determines a sparse warp map, which has fewer control points than a full warp map, to reduce the amount of memory needed to store the warp map. In some examples, the configuration data provided by the software application 402 includes a full warp map. In such examples, the example configuration circuitry 408 subsamples the full warp map to determine the sparse warp map 410.

The example horizontal warper circuitry 412 of FIG. 4 receives the input image 404 from the software application 402 and a sparse warp map 410 from the example configuration circuitry 408. The example horizontal warper circuitry 412 warps the image horizontally to produce a horizontally warped image 414. The example horizontal warper circuitry 412 implements separate decimation and interpolation operations. The horizontally warped image 414 is explored further in FIG. 5.

The example vertical warper circuitry 416 of FIG. 4 receives the horizontally warped image 414 from the example horizontal warper circuitry 412 and the sparse warp map 410 from the example configuration circuitry 408. The example vertical warper circuitry 416 vertically warps the horizontally warped image 414 to produce the output image 406. To perform a vertical warp operation, the example vertical warper circuitry 416 stores pixel data by column into example partial frame memory 420. The example vertical warper circuitry 416 also implements separate decimation and interpolation operations. In some examples, the vertical warper circuitry 416 may receive the input image 404 directly and produce a vertically warped image, which is then provided to the example horizontal warper circuitry 412 to produce the output image 406. The example vertical warper circuitry 416 is explored further in FIG. 5.

The example data controller circuitry 418 of FIG. 4 serves as an interface between the example vertical warper circuitry 416 and the example partial frame memory 420. For example, the example data controller circuitry 418 may receive column pixel data from the example vertical warper circuitry 416 and store the data in the example partial frame memory 420. The example data controller circuitry 418 may also receive requests for pixel data from the example vertical warper circuitry 416 and retrieve said data from the example partial frame memory 420. In some examples, the example data controller circuitry 418 may additionally provide external applications with access to the example partial frame memory 420. For example, an external application may provide the example data controller circuitry 418 with distorted images. The images may be distorted for any reason. The example data controller circuitry 418 may store the distorted image data in the example partial frame memory 420 so it can be accessed by the example vertical warper circuitry 416 and example horizontal warper circuitry 412. The example vertical warper circuitry 416 and example horizontal warper circuitry 412 may then determine how to warp the images to remove the distortion.

The example partial frame memory 420 stores the pixel column data for the example vertical warper circuitry 416. The example partial frame memory 420 can be considered partial because the amount of memory required to warp a single image is less than the total number of pixels in the image. The use of the example partial frame memory 420 is explored further in FIGS. 4, 6.

The example partial frame memory 420 is implemented by any memory, storage device and/or storage disc for storing data such as, for example, flash memory, magnetic media, optical media, solid state memory, hard drive(s), thumb drive(s), etc. Furthermore, the data stored in the example partial frame memory 420 may be in any data format such as, for example, binary data, comma delimited data, tab delimited data, structured query language (SQL) structures, etc. While, in the illustrated example, the example partial frame memory 420 is illustrated as a single device, the example partial frame memory 420 and/or any other data storage devices described herein may be implemented by any number and/or type(s) of memories.

The example warper circuitry 400 warps images more efficiently than previous solutions. The example warper circuitry 400 saves computation cost by implementing an example dynamically sized column buffers in example partial frame memory 420 instead of an image transpose that requires a full frame memory, and by separating the decimation and interpolation operations to reduce latency.

The example warper circuitry 400 may provide added functionality over previous solutions to warp images. For example, the separation of decimation and interpolation operations results in bandwidth savings that may be used to support more extreme changes in scale factor than previous solutions that perform decimation and interpolation concurrently. These changes may result in a more efficient manner of producing foveated images. A foveated image contains lower resolution around the edge of the image than the center of the image. VR and AR applications may use foveated images to save bandwidth by leveraging the fact that the lower resolution portions of the image are observed in users' peripheral vision, making it difficult to perceive. As another example, the reduced latency provided by the separation of operations may reduce the overall system latency of a VR or AR application. Such a reduction of latency may help to mitigate the effects of nausea some users may experience with such applications.

Figure 5:
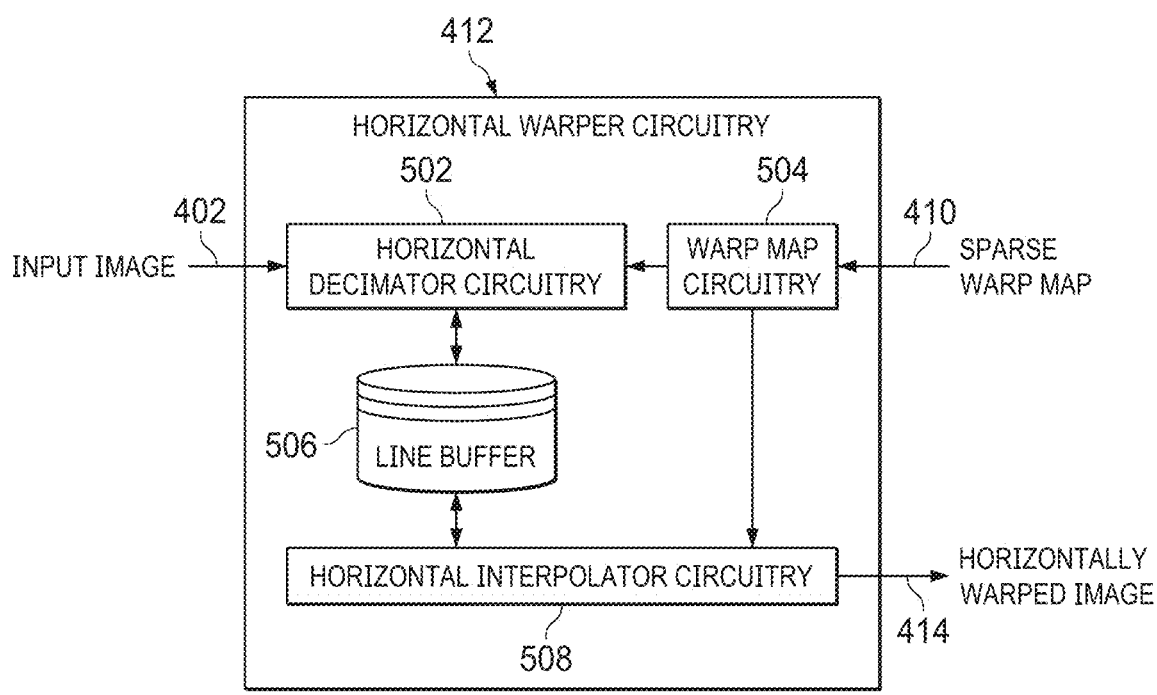
FIG. 5 is a block diagram of an example implementation of the horizontal warper circuitry of FIG. 4.

FIG. 5 is a block diagram of an example implementation of the horizontal warper circuitry of FIG. 4. The example horizontal warper circuitry 412 includes example horizontal decimator circuitry 502, example warp map circuitry 504, an example line buffer 506, and example horizontal interpolator circuitry 508.

The example warp map circuitry 504 of FIG. 5 receives the sparse warp map 410 from the example configuration circuitry 408 and determines the horizontal component of a full warp map, which has more rectangles than a sparse warp map. The example warp map circuitry 504 determines the horizontal component of the full warp map by performing a bilinear interpolation on the sparse warp map. In examples where the sparse warp map has 32 rows and 18 columns of rectangles, the length of the rectangles being equal to a power of two allows the example warp map circuitry 504 to perform the bilinear interpolation using a shift operation rather than a division operation. The length of the rectangles being equal to a power of two additionally removes the need for the bilinear interpolation to use weights. Therefore, examples where the example configuration circuitry 408 warp map has rectangle lengths equal to a power of two are advantageous because it reduces the computational expense of converting the sparse warp map into a full warp map.

The horizontal component of a full warp map is the subset of data within a full warp map that describe horizontal pixel transformations required to convert a rectangle from the input image 404 into arbitrary quadrilaterals in the output image 406. The example warp map circuitry 504 provides the horizontal component of the full warp map to both the example horizontal decimator circuitry 502 and the example horizontal interpolator circuitry 508.

The example horizontal decimator circuitry 502 receives the input image 404 as a stream of pixel data arriving in raster order. The example horizontal decimator circuitry 502 decimates a subset of the stream of pixel data using a first polyphase filter. As used herein, decimation refers to the process of resampling incoming pixel data from the stream of pixel data to reduce the total amount of data in a given region.

The example horizontal decimator circuitry 502 determines which of the received pixels should be sampled based on the horizontal component of the full warp map provided by the example warp map circuitry 504. For example, the example horizontal decimator circuitry 502 may identify a first group of subsequent pixels from the incoming stream that belong to the same row and first example rectangle of the input image 404. Furthermore, the example horizontal decimator circuitry 502 may use the horizontal component of the full warp map to determine that the example rectangle composed by the first group of subsequent pixels has a width rect_w1. The example horizontal decimator circuitry 502 may use the horizontal component of the full warp map to determine that the quadrilateral of the output image 406 that corresponds to the example rectangle has a width quad_w1. If the width of the first example rectangle is larger than the corresponding quadrilateral (i.e., rect_w1>quad_w1), the example horizontal decimator circuitry 502 may decimate a subset of the group of subsequent pixels and remove the unsampled pixels. This data removal is beneficial because the input image 404 contains more data to describe the width of the first example rectangle that is needed to produce the width of the corresponding quadrilateral on the output image 406.

In other examples, the example horizontal decimator circuitry 502 may identify a second group of subsequent pixels from the input image 404 that compose a second example rectangle of width rect_w2 and correspond to a different quadrilateral from the output image 406 of width quad_w2. In such examples, if the width of the second example rectangle is shorter than the output quadrilateral (i.e., rect_w2<quad_w2), the example horizontal decimator circuitry 502 may not decimate any pixels from the second group of subsequent pixels. This decision not to remove data is beneficial because when the pixels are received by the example horizontal decimator circuitry 502, the data in the input image 404 used to describe the width of the first example rectangle is not sufficient to produce the width of the corresponding quadrilateral on the output image 406.

After deciding whether to decimate a group of pixels belonging to a row of a given rectangle of the input image 404, the example horizontal decimator circuitry 502 stores pixels it did not remove into the example line buffer 506. For example, in the foregoing examples, the example horizontal decimator circuitry 502 stores the subset of the first group of subsequent decimated pixels in the example line buffer 506, and additionally stores all of the second group of subsequent pixels in the line buffer. The example horizontal decimator circuitry 502 is explored further in FIG. 15.

The example line buffer 506 of FIG. 5 is an amount of memory that stores pixel data that has been processed by the example horizontal decimator circuitry 502. The example horizontal decimator circuitry 502 populates the example line buffer 506 with a group of pixels as soon as they are processed, so the example line buffer 506 also receives data as a stream of pixel data arriving in raster order. The example line buffer 506 is implemented by memory capable of storing a full row of pixel data, which supports any hypothetical width of a rectangle on the input image 404. The example line buffer 506 may be implemented by any type of memory.

The example horizontal interpolator circuitry 508 of FIG. 5 accesses groups of pixels from the line buffer that belong to the same row and compose the same rectangle on the input image 404. The example horizontal interpolator circuitry 508 then determines which groups of subsequent pixels to interpolate according to the horizontal component of the full warp map provided by the example warp map circuitry 504. As used herein, interpolation refers to the process of mapping a pixel from a rectangle in the input image 404 to the geometry of the corresponding quadrilateral in the output image 406. Interpolation additionally refers to estimating additional pixel values to fill in the corresponding quadrilateral when necessary. The example horizontal interpolator circuitry 508 performs interpolation using a second polyphase filter that is separate from the first polyphase filter used for decimation.

Decimation and interpolation are mutually exclusive for a given rectangle on the input image 404. This means that any rectangle that was horizontally sampled by the example horizontal decimator circuitry 502 (e.g., the first group of subsequent pixels from the foregoing example where rect_w1>quad_w1) will not be interpolated by the example horizontal interpolator circuitry 508. This lack of interpolation occurs because there is no need to calculate additional pixel data to produce the corresponding quadrilateral on the output image 406. Conversely, any rectangle that was not decimated by the example horizontal decimator circuitry 502 (e.g., the second group of subsequent pixels from the foregoing example where rect_w2<quad_w2) will be interpolated by the example horizontal interpolator circuitry 508. This interpolation produces the additional pixel data necessary to produce the corresponding quadrilateral on the output image 406. The example horizontal interpolator circuitry 508 is explored further in FIG. 15.

The example horizontal decimator circuitry 502 and example horizontal interpolator circuitry 508 work to down sample pixels and determine new pixel data on a row of input rectangle/output quadrilateral basis. As a result, pixel data completes horizontal processing as a stream of pixels that is produced in raster order. After every row of the input image 404 is decimated and interpolated, the corresponding pixel data can collectively be referred to as a horizontally warped image 414. The horizontally warped image 414 meets the requirements indicated by the example warp map circuitry 504 and is created using an example line buffer 506 to store rows of pixel data in between the decimation and interpolation operations.

The separation of the decimation and interpolation operations mitigates the latency found in previous solutions that perform the operations concurrently and allows for more extreme changes in scaling factor. For example, if an input image 402 has extreme warping requirements that exceed the allocated memory used to save a warp map, the vertical decimator circuitry 602 may scale down the image slightly more than necessary to reduce data storage in the partial frame memory 420, while the vertical interpolator circuitry 604 undoes this scaling, resulting in a working solution with a minor loss of fidelity.

Figure 6:
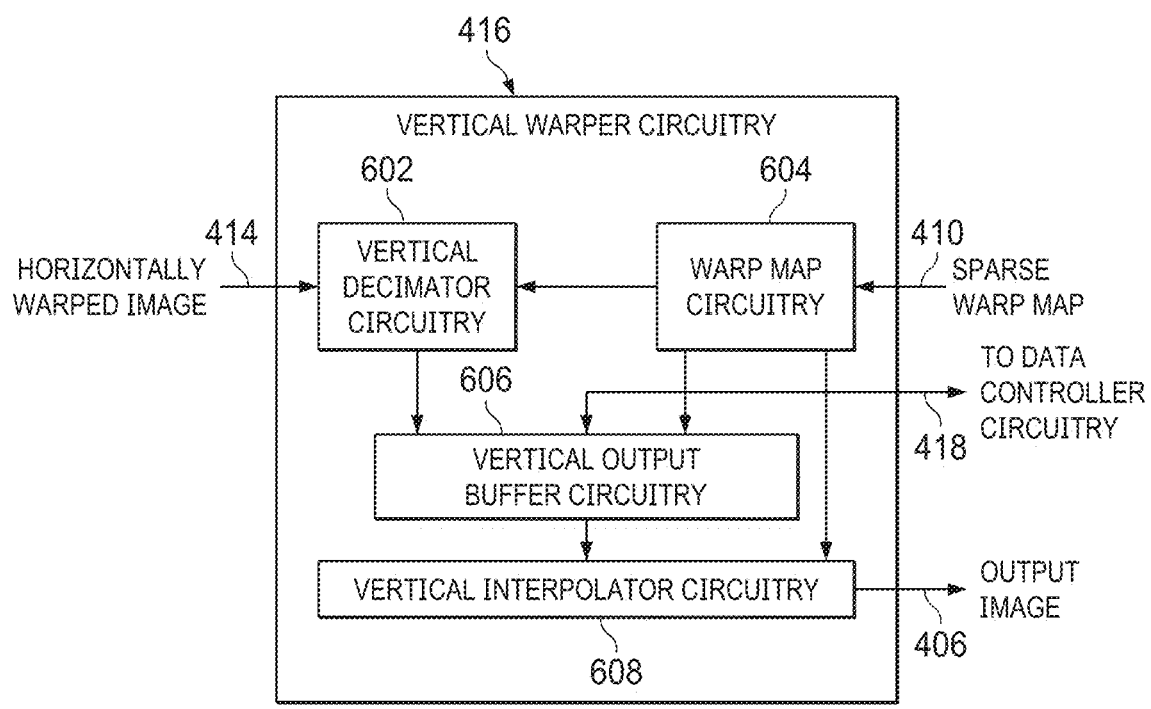
FIG. 6 is a block diagram of an example implementation of the vertical warper circuitry of FIG. 4.

FIG. 6 is a block diagram of an example implementation of the vertical warper circuitry 416 of FIG. 4. FIG. 6 includes example warp map circuitry 604, example vertical decimator circuitry 602, example vertical output buffer circuitry 606, and example vertical interpolator circuitry 608.

The example warp map circuitry 604 of FIG. 6 receives the sparse warp map 410 from the example configuration circuitry 408 and determines the vertical component of a full warp map. The vertical component of a full warp map is the subset of data within a full warp map that describe vertical pixel transformations required to convert a rectangle from the input image 404 into a corresponding arbitrary quadrilateral of the output image 406. The example warp map circuitry 504 of FIG. 5 and the warp map circuitry 604 of FIG. 6 both use bilinear interpolation on the sparse warp map 410 to produce a single component (i.e., horizontal or vertical) of the same full warp map. The warp map circuitry 604 provides the vertical component of the full warp map to the example vertical decimator circuitry 602, the example vertical output buffer circuitry 606, and the example vertical interpolator circuitry 608.

The example vertical output buffer circuitry 606 of FIG. 6 receives the vertical component of the full warp map from the example warp map circuitry 504 and uses it to partition the example partial frame memory 420. The example vertical output buffer circuitry 606 partitions the example partial frame memory 420 into dynamically sized first in first out (FIFO) column buffers such that each column of the horizontally warped image 414 receives its own buffer. For example, if the horizontally warped image 414 has 4K resolution, the example partial frame memory 420 may be partitioned into 4096 buffers. In other examples, the example partial frame memory 420 is partitioned into a different number of buffers.

The example vertical output buffer circuitry 606 determines the lengths of the FIFO column buffers to be a minimum length required to create the relevant column of the output image. For example, if the vertical component of the full warp map indicates that a first output column requires 1000 pixels to be created and a second output column requires 400 pixels to be created, the example vertical output buffer circuitry 606 partitions the partial memory to create a first buffer that is 1000 elements long for the first column and a second buffer that is 400 elements long for the second column. The example vertical output buffer circuitry 606 may partition the example partial frame memory 420 into dynamically sized buffers before any pixel data from the horizontally warped image arrives.

The example vertical decimator circuitry 602 of FIG. 6 receives the horizontally warped image 414 from the example horizontal warper circuitry 412 as a stream of pixel data arriving in raster order. The example vertical decimator circuitry 602 decimates a subset of the stream of pixel data using a third polyphase filter.

The example vertical decimator circuitry 602 determines which of the received pixels should be sampled based on the vertical component of the full warp map provided by the example warp map circuitry 504. For example, after receiving a first pixel, the example vertical decimator circuitry 602 determines a first example rectangle of the input image 404 that the first pixel belongs to and the height of the first example rectangle, rect_h1. The example vertical decimator circuitry 602 also determines which column in the corresponding quadrilateral of the output image 406 matches the column of the first example rectangle that contains the first pixel and the height of the column, quad_h1. If the height of the first example rectangle is larger than the height of the corresponding column, (i.e., red_h1>quad_h1), the example vertical decimator circuitry 602 may perform additional calculation using the vertical component of the full warp map to determine whether the pixel should be sampled. This additional calculation is advantageous because only a subset of the pixels from the rectangle column that contains the first pixel are required to produce the corresponding column of the corresponding quadrilateral in the output image 406. The additional calculation, which is explored further in FIG. 15, determines whether the first pixel is included in the subset of necessary pixels.

In other examples, the example vertical decimator circuitry 602 may receive a second pixel adjacent to the first pixel that belong to the same first example rectangle with a height of rect_h1. The example vertical decimator circuitry 602 may then use the vertical component of the full warp map to determine the height of the column in the corresponding output quadrilateral that contains the second pixel, quad_h2. If the height first example rectangle is smaller than the height of the corresponding column, (i.e. rect_h1 <quad_h1), the example vertical decimator circuitry 602 provides the second pixel to the example vertical output buffer circuitry 606 without performing the foregoing calculation to determine whether to sample the second pixel. In such examples, the foregoing calculation is not required because the second pixel is part of a column of a rectangle that, before vertical interpolation, does not have sufficient data to produce the corresponding column of the corresponding quadrilateral of the output image 406.

After deciding which pixels to vertically sample, the example vertical decimator circuitry 602 provides any pixels it did not remove to the example vertical output buffer circuitry 606. This includes both pixels that qualified for decimation and were sampled, and pixels that qualify for interpolation rather than decimation. For example, the first pixel of the foregoing example, which was sampled by the vertical decimator circuitry 602, would be provided to the example vertical output buffer circuitry 606. Furthermore, the second pixel of the foregoing example, which qualifies for interpolation and was not considered by the vertical decimator circuitry 602, is also provided to the example vertical output buffer circuitry 606.

The example vertical output buffer circuitry 606 continuously stores pixels it receives from the example vertical decimator circuitry 602 into their respective FIFO column buffers via the example data controller circuitry 418. As it stores pixels, the example vertical output buffer circuitry 606 checks the example partial frame memory 420 to determine whether it contains sufficient data to create a row of the output image 406. If there is sufficient data, the example vertical output buffer circuitry 606 communicates with the example data controller circuitry 418 to provide the data to the example vertical output buffer circuitry 606.

The example vertical interpolator circuitry 608 of FIG. 6 receives data to produce a row of the output image 406 when it is available. The example vertical interpolator circuitry 608 then interpolates the necessary pixels to produce a row of the output image 406. Like the example horizontal warper circuitry 412, decimation and interpolation in the example vertical warper circuitry 416 are mutually exclusive. Therefore, the example vertical interpolator circuitry 608 performs interpolation using a fourth polyphase filter that is separate from the third polyphase filter used for decimation. Furthermore, any pixels belonging to a column of an input rectangle that were not decimated (i.e., columns whose height is shorter than the height of the corresponding column of the corresponding quadrilateral) will be interpolated by the example vertical interpolator circuitry 608. The example vertical interpolator circuitry 608 vertically interpolates the necessary pixels using the vertical component of the full warp map. The vertical interpolation process is explored further in FIG. 16. A row of the output image 406 may be considered fully warped, as it has undergone both horizontal and vertical warping. The example vertical interpolator circuitry 608 continually receives data and produces output rows until the entire output image 406 is complete and fully warped.

The example vertical warper circuitry 416 receives a sparse warp map 410 and a horizontally warped image 414. The example vertical output buffer circuitry 606 stores less than a full frame of pixel data, which is required for transpose operations from previous solutions to warp images. Instead, the example vertical output buffer circuitry 606 stores only decimated pixels into dynamically sized FIFO column buffers, resulting in usage of a partial frame of pixel data. As a result, the example vertical warper circuitry 416 both reduces memory overhead and mitigates latency from data transfer when compared to previous solutions to warp images. Additionally, the separation of the decimation and interpolation operations mitigates the latency found in previous solutions that perform the operations concurrently and allows for more extreme changes in scaling factor.

FIG. 7 is an illustrative example of horizontal warping. FIG. 7 includes an example input image 702 and an example warped image 704. The example input image 702 is an image that may require horizontal warping. The example input image 702 may be digitally stored in any image file format. The example input image 702 includes a reference pixel 706.

The example warped image 704 of FIG. 7 shows how the example horizontal warper circuitry 412 moves the reference pixel 706 relative to its original position on the input image 702. To make such a horizontal coordinate transformation, the reference pixel 706 is sampled by the example horizontal decimator circuitry 502 and stored in an example line buffer 506. The reference pixel 706 stays in the example line buffer 506 until the example horizontal interpolator circuitry 508 determines new horizontal coordinates for it.

FIG. 8 is a first illustrative example of vertical warping. FIG. 8 includes an example input image 802 and an example warped image 804. The example input image 802 is an image that may require vertical warping. For comparison, the example input image 702 of FIG. 7 matches the example input image 802 of FIG. 8. The example input image 802 includes a reference pixel 806.

The example warped image 804 of FIG. 8 shows how the example vertical warper circuitry 416 moves the reference pixel 806 relative to its original position on the example input image 802. To make such a vertical coordinate transformation, the reference pixel 806 is sampled by the example vertical decimator circuitry 602 and stored in a dynamically sized FIFO column buffer within example partial frame memory 420. While the warped image 804 illustrates FIFO column buffers of equal length, as indicated by the warped image being equally compressed with an equal resolution across columns, other images may be warped using FIFO column buffers of different lengths as determined by a warp map.

Figure 9:
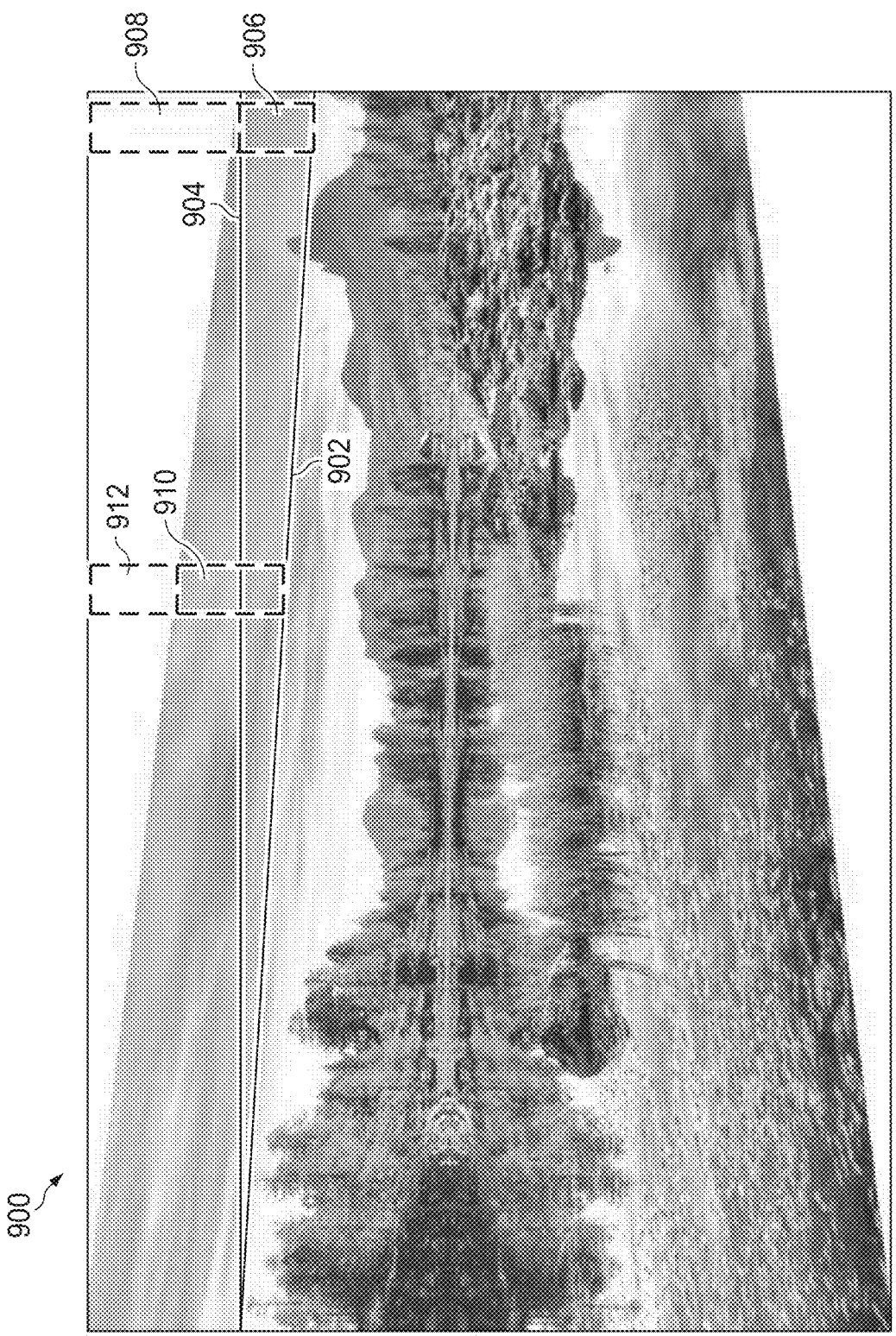
FIG. 9 is a second illustrative example of vertical warping.

FIG. 9 is a second illustrative example of vertical warping. FIG. 9 includes shows a vertically warped image 900. The vertically warped image 900 is annotated to include an input line 902, an output line 904, a first area 906, a second area 908, a third area 910, and a fourth area 912.

The input line 902 of FIG. 9 corresponds to a line of horizontally warped pixels from the horizontally warped image 414. The input line 902 is one row of pixels in a plurality of rows received by the example vertical warper circuitry 416 in raster order. The input line 902 curves downward because the example vertical warper circuitry 416 did not warp the vertically warped image 900 evenly. For example, the right side of the vertically warped image 900 is compressed more than the left side of the image. This uneven warping is caused by pixels to the right of the input line 902 having a larger vertical coordinate transformation than pixels to the left of the input line 902, which is illustrated by the downward curve in the input line 902.

The output line 904 of FIG. 9 corresponds to a line of vertically warped pixels in the vertically warped image 900. The output line 904 shows where pixels in the input line 902 would be positioned if the horizontally warped image 414 had not been vertically warped. The space between the input line 902 and output line 904, therefore, represents the total vertical warping experienced by each pixel in in the input line 902.

The first area 906 of FIG. 9 represents decimated pixels in the rightmost column of the vertically warped image 900. While the first area 906 is widened in FIG. 9 for visual clarity, in practice, the FIFO column buffer that holds pixels in the first area 906 holds pixels from only one column. The pixels in the first area 906 appear in the vertically warped image 900 because they were not removed by the example vertical decimator circuitry 602 and were stored in a FIFO column buffer of example partial frame memory 420.

The second area 908 of FIG. 9 represents an amount of pixels in the rightmost column of the horizontally warped image 414 that were removed by the example vertical decimator circuitry 602. Because the pixels were not sampled, they do not appear in the vertically warped image 900 and therefore do not require storage in a FIFO column buffer. As a result, the FIFO column buffer for the rightmost column is only required to only hold the first area 906 of pixels in example partial frame memory 420.

The FIFO column buffers implemented by the example vertical output buffer circuitry 606 are dynamically sized to both minimize memory usage and store the required data for the example vertical interpolator circuitry 608. For example, consider a column in the middle of the vertically warped image 900. This column is warped less than the right most column of the image and therefore has a greater number of pixels in the vertically warped image 900 than the right most column. These additional pixels mean that length of the FIFO column buffer for the middle column, which contains decimated pixels within the third area 910, is some amount larger than the length of the FIFO column buffer that holds decimated pixels from the first area 906. However, the FIFO column buffer for the middle column would still have a smaller length than the full column length of the horizontally warped image 414, as pixels in the fourth area 912 were removed during decimation and do not require storage. This contrasts previous solutions to warp images, which require a full frame of memory for a transpose operation. If the full frame were to be organized into columns for comparison, it would require storage of pixels in both the first area 906 and second area 908 for the right most column, third area 910 and fourth area 912 for the middle column, etc., for every column in the horizontally warped image 414.

Figure 10:
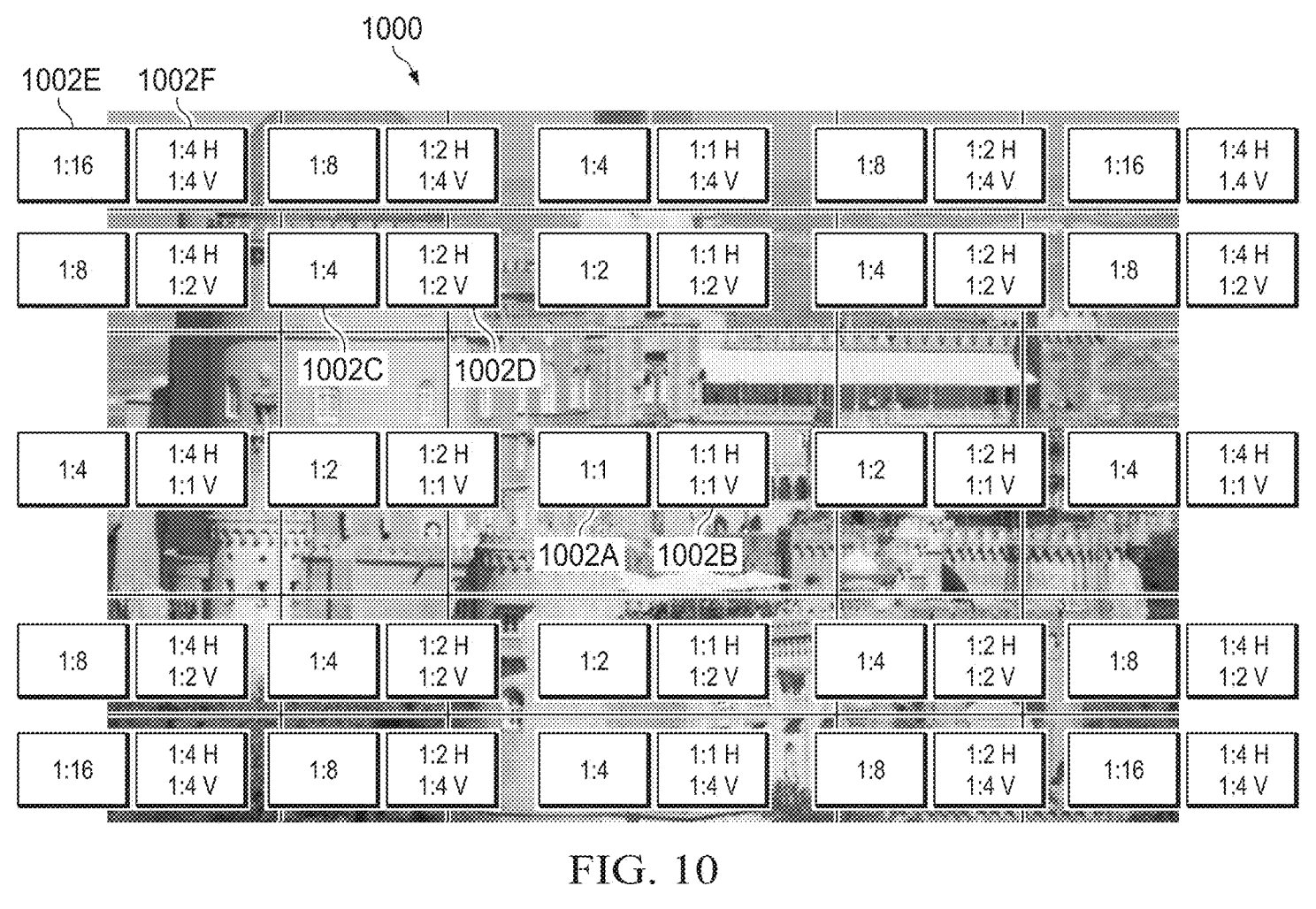

FIG. 10 is an illustrative example of foveated rendering. FIG. 10 includes a pre-rendered image 1000 and scaling factors 1002. The scaling factors 1002 include but are not limited to a first total scaling factor 1002A, first component scaling factor 1002B, a second total scaling factor 1002C, second component scaling factor 1002D, a third total scaling factor 1002E, and a third component scaling factor 1002F.

The pre-rendered image 1000 is an image that requires a foveated rendering. The pre-rendered image 1000 may need a foveated rendering for any reason. Example use cases of foveated renderings include VR and AR applications to reduce computational overhead. In some examples, the pre-rendered image 1000 is rendered by a GPU.

A foveated rendering is one where the periphery of an image is a lower resolution than the center. A foveated image may be required from an example software application with VR or AR applications. The software application in the illustrative example of FIG. 10 is an example implementation of the software application 402 of FIG. 4. To achieve a foveated rendering, the example software application samples pixels from the pre-rendered image according to the scaling factors 1002. For example, in the region with the first component scaling factor 1002B, the example software application 402 may sample every pixel in both the horizontal and vertical directions of the center bounded region, where users focus their attention. As a result, an output rendered image would have a 1:1 total scaling factor 1002A in the center bounded region relative to the pre-rendered image 1000.

The software application 402 samples the pre-rendered image 1000 unevenly to achieve the foveated effect. For example, in the region with the second scaling factor 802C, the example software application 402 only samples one in every two pixels vertically and one in every two pixels horizontally. As a result, the output rendered image would have a 1:4 total scaling factor 802C in the bounded region relative to the pre-rendered image 1000. To lower the resolution at the periphery of the pre-rendered image 1000, the scaling factor is increased. For example, in the region with the third scaling factor 1002E, the software application only samples one in every four pixels vertically and one in every four pixels horizontally. As a result, the output rendered image would have a 1:16 total scaling factor 1002F in the bounded region relative to the pre-rendered image 1000.

The software application 402 may divide the pre-rendered image 1000 into regions and determine a scaling factor for the region based on the computational resources of the hardware projecting the final image (for example, a VR or AR headset). In some examples, the software application may determine the scaling factor and region divisions based on sensor input data that tracks a user's eye movement. In such examples, the software application 402 can achieve foveation on different parts of the pre-rendered image 1000. By sampling the pre-rendered image 1000 to achieve a foveated image, the software application 402 may reduce memory overhead and latency by removing data in portions of the image that are difficult for a user to detect.

Figure 11:
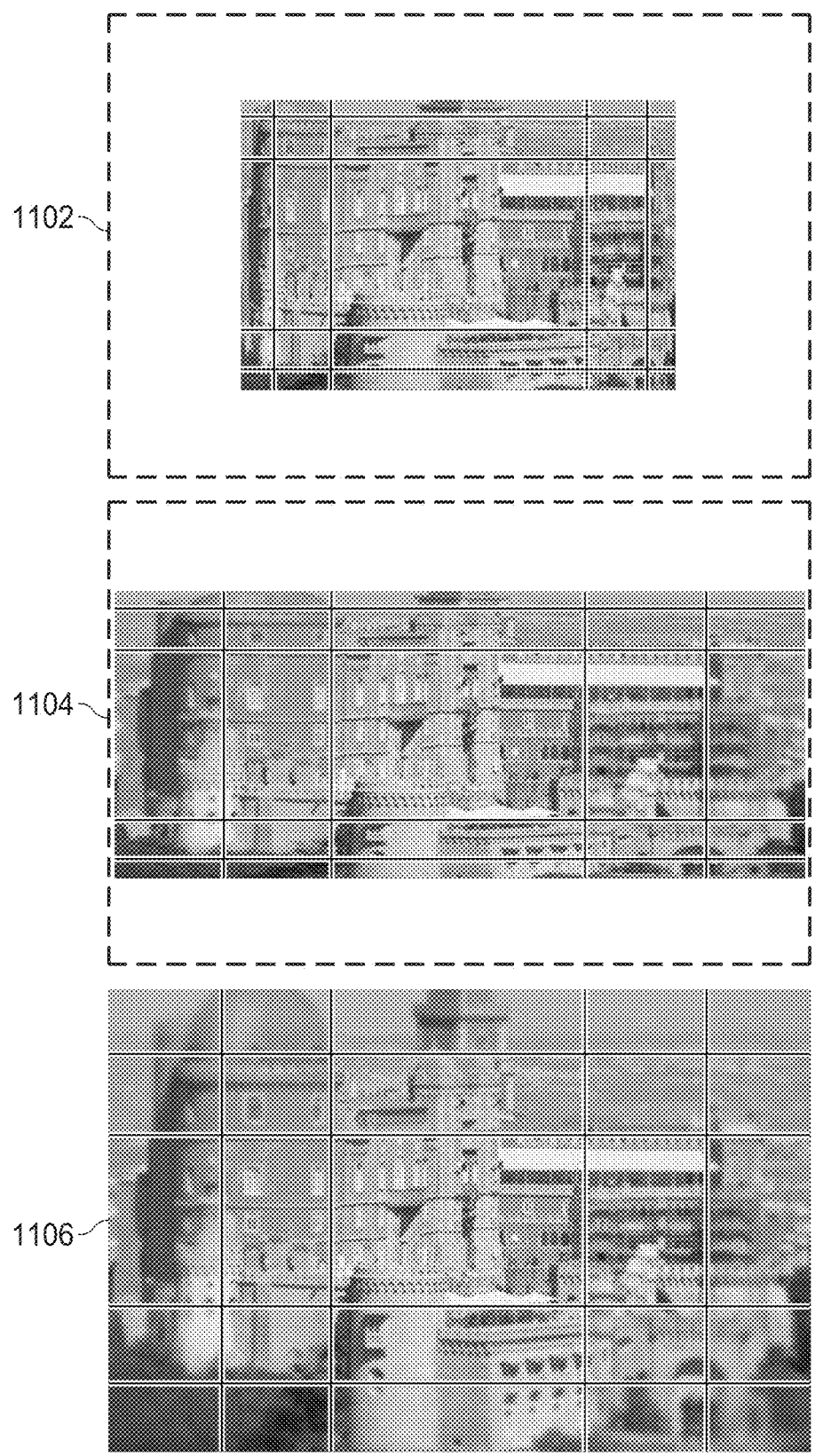
FIG. 11 is an illustrative example of warping an image with foveated rendering.

FIG. 11 is an illustrative example of warping an image with foveated rendering. FIG. 11 includes an input image 1102, a horizontally warped image 1104, and an output image 1106.

The input image 1102 of FIG. 11 is an example implementation of the input image 404 of FIG. 4. Specifically, the input image 1102 is a copy of the pre-rendered image 1000 of FIG. 10 after it has been sampled according to the scaling factors 1002. The sampling results in an input image 404 that has less data and an altered aspect ratio relative to the pre-rendered image 1000. To correct the aspect ratio, the input image 1102 requires both horizontal and vertical warping.

The horizontally warped image 1104 of FIG. 11 is an example implementation of the horizontally warped image 1104 of FIG. 4. Specifically, the horizontally warped image 1104 shows the input image 1102 after it has been warped by the example horizontal warper circuitry 412. To warp the input image, the example horizontal warper circuitry 412 uses the horizontal component of a full warp map to decimate and interpolate various rows of rectangles of the input image 404 to achieve the proper width of the corresponding quadrilaterals of the output image 406. In applications with foveated images, such as the software application 402 in the illustrative example of FIG. 10, the example warp map circuitry 504 may calculate a horizontal component of a full warp map that is proportional to the scaling factors 1002 of FIG. 10. For example, comparison of the bounding regions on the input image 404 and horizontally warped image 1104 show that pixels on the left and right portions of the images had higher scaling factors 1002 and were warped further than pixels in the center of the images.

The output image 1106 of FIG. 11 is an example implementation of the output image 406 of FIG. 4. Specifically, the output image 1106 shows the horizontally warped image 1104 after it has been warped by the example vertical warper circuitry 416. The output image 1106 shows that, like the horizontal component of the full warp map, the example warp map circuitry 504 may determine the vertical component of the full warp map to be proportional to the scaling factors 1002. For example, comparison of the bounding regions on the horizontally warped image 1104 and output image 1106 show that pixels on the top and bottom portions of the images had higher scaling factors 1002 and were warped further than pixels in the center of the images.

The warper circuitry 400 warps the input image 404 to create the output image 406. The output image 1106 is both a foveated rendering of the pre-rendered image 1000 and has the same aspect ratio of the pre-rendered image 1000. The reduction of pixel data from the foveated rendering means the output image 406 is less computationally expensive to project on a VR or AR headset. The reduction also results in a blurring effect around the periphery of the output image 1106 that is difficult for users of the VR or AR headset to perceive. The separation of decimation and interpolation operations in the warper circuitry 400 result in bandwidth savings that may support greater changes in scaling factor and more extreme foveation than previous solutions.

While an example manner of implementing the warper circuitry of FIG. 4 is illustrated in FIGS. 5 and 6, one or more of the elements, processes, and/or devices illustrated in FIGS. 5 and 6, may be combined, divided, re-arranged, omitted, eliminated, and/or implemented in any other way. Further, the example configuration circuitry 408, example horizontal warper circuitry 412, example vertical warper circuitry 416, example data controller circuitry 418, example partial frame memory 420, and/or, more generally, the example warper circuitry 400 of FIG. 4, may be implemented by hardware alone or by hardware in combination with software and/or firmware. Thus, for example, any of the example configuration circuitry 408, example horizontal warper circuitry 412, example vertical warper circuitry 416, example data controller circuitry 418, example partial frame memory 420, and/or, more generally, the example warper circuitry 400 of FIG. 4, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example warper circuitry 400 of FIG. 4 may include one or more elements, processes, and/or devices in addition to, or instead of, those illustrated in FIGS. 3 and 4, and/or may include more than one of any or all of the illustrated elements, processes and devices. In some examples, the warper circuitry 400 is implemented by the Texas Instruments® DLPC8430 ASIC.

Flowcharts representative of example hardware logic circuitry, machine readable instructions, hardware implemented state machines, and/or any combination thereof for implementing the example warper circuitry 400 of FIG. 4 is shown in FIGS. 12-16. The machine readable instructions may be one or more executable programs or portion(s) of an executable program for execution by processor circuitry, such as the processor circuitry 1712 shown in the example processor platform 1700 discussed below in connection with FIG. 17 and/or the example processor circuitry discussed below in connection with FIGS. 14 and/or 15. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 12-16, many other methods of implementing the example warper circuitry 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 12-16 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 12:
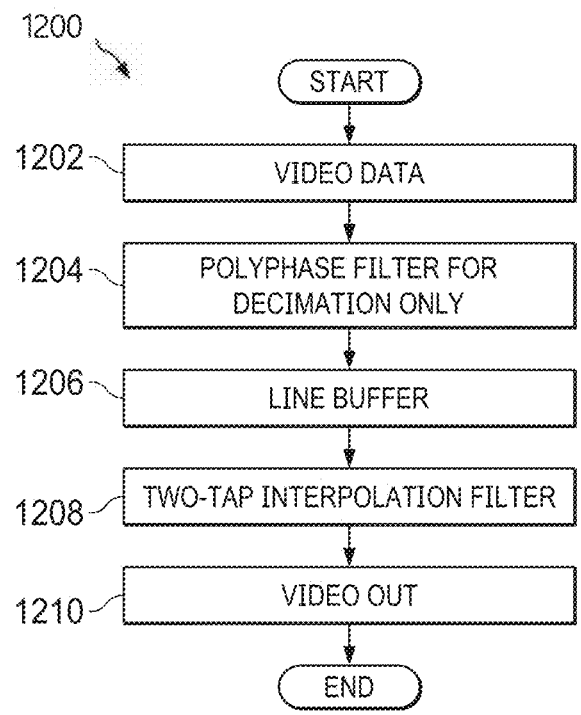
FIG. 12 is a flowchart representative of example machine readable instructions that may be executed by example processor circuitry to implement the horizontal warper circuitry of FIG. 4.

FIG. 12 is a flowchart representative of example machine readable instructions and/or example operations 1200 that may be executed and/or instantiated by processor circuitry to horizontally warp an image. The machine readable instructions and/or operations 1200 begin when the horizontal decimator circuitry 502 accesses video data. (Block 1202). The horizontal decimator circuitry 502 may access video data as a sequence of images, where each image corresponds to a frame of video. Furthermore, the horizontal decimator circuitry 502 may access pixel data from a given image in raster order.

The horizontal decimator circuitry 502 implements a polyphase filter for decimation only. (Block 1204). The horizontal decimator circuitry 502 may use a horizontal component of a warp map to determine which pixels are decimated.

The horizontal warper circuitry 412 implements a line buffer 506. (Block 1206). The horizontal decimator circuitry 502 stores decimated pixels in a given row in the line buffer.

The horizontal interpolator circuitry 508 implements a two tap interpolation filter. (Block 1208). The horizontal interpolator circuitry 508 accesses pixels from the line buffer 506 and decides which pixels to interpolate using a horizontal component of a warp map.

The horizontal warper circuitry 412 provides an output video. (Block 1210). The output video may be generated as a series of horizontally warped images. The output video may be displayed on devices including but not limited to a projector, a VR headset, or an AR headset. The example machine readable instructions and/or operations 1200 end after block 1210.

Figure 13:
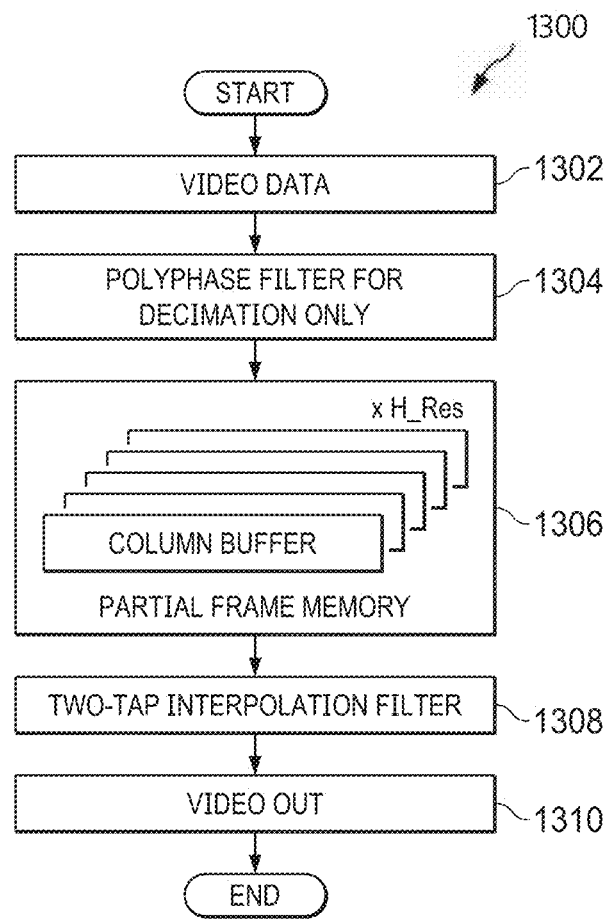
FIG. 13 is a flowchart representative of machine readable instructions that may be executed by example processor circuitry to implement the vertical warper circuitry of FIG. 4.

FIG. 13 is a flowchart representative of example machine readable instructions and/or example operations 1300 that may be executed and/or instantiated by processor circuitry to vertically warp an image. The machine readable instructions and/or operations 1300 begin when the vertical decimator circuitry 602 accesses video data. (Block 1302). The vertical decimator circuitry 602 may access video data as a sequence of images, where each image corresponds to a frame of video. Furthermore, the vertical decimator circuitry 602 may access pixel data from a given image in raster order.

The vertical decimator circuitry 602 implements a polyphase filter for decimation only. (Block 1304). The vertical decimator circuitry 602 may use a vertical component of a warp map to determine which pixels are decimated.

The vertical output buffer circuitry 606 implements partial frame memory 420. (Block 1306). The vertical output buffer circuitry 606 partitions a section of memory into a number of FIFO buffers, where the number of buffers is equal to the number of columns (i.e., the horizontal resolution) of the current input image. Each FIFO buffer is uniquely sized to only be large enough to hold pixels that were not removed by the vertical decimator circuitry 602 at block 1304. As such, only part of the input image (i.e., a partial frame) only needs storage in memory to vertically warp the input image.

The vertical interpolator circuitry 608 implements a two tap interpolation filter. (Block 1308). The vertical interpolator circuitry 608 accesses pixels from the partial frame memory 420 and decides which pixels to interpolate using a vertical component of a warp map.

The vertical warper circuitry 416 provides an output video. (Block 1310). The output video may be generated as a series of vertically warped images. The output video may be displayed on devices including but not limited to a projector, a VR headset, or an AR headset. The example machine readable instructions and/or operations 1300 end after block 1310.

Figure 14:
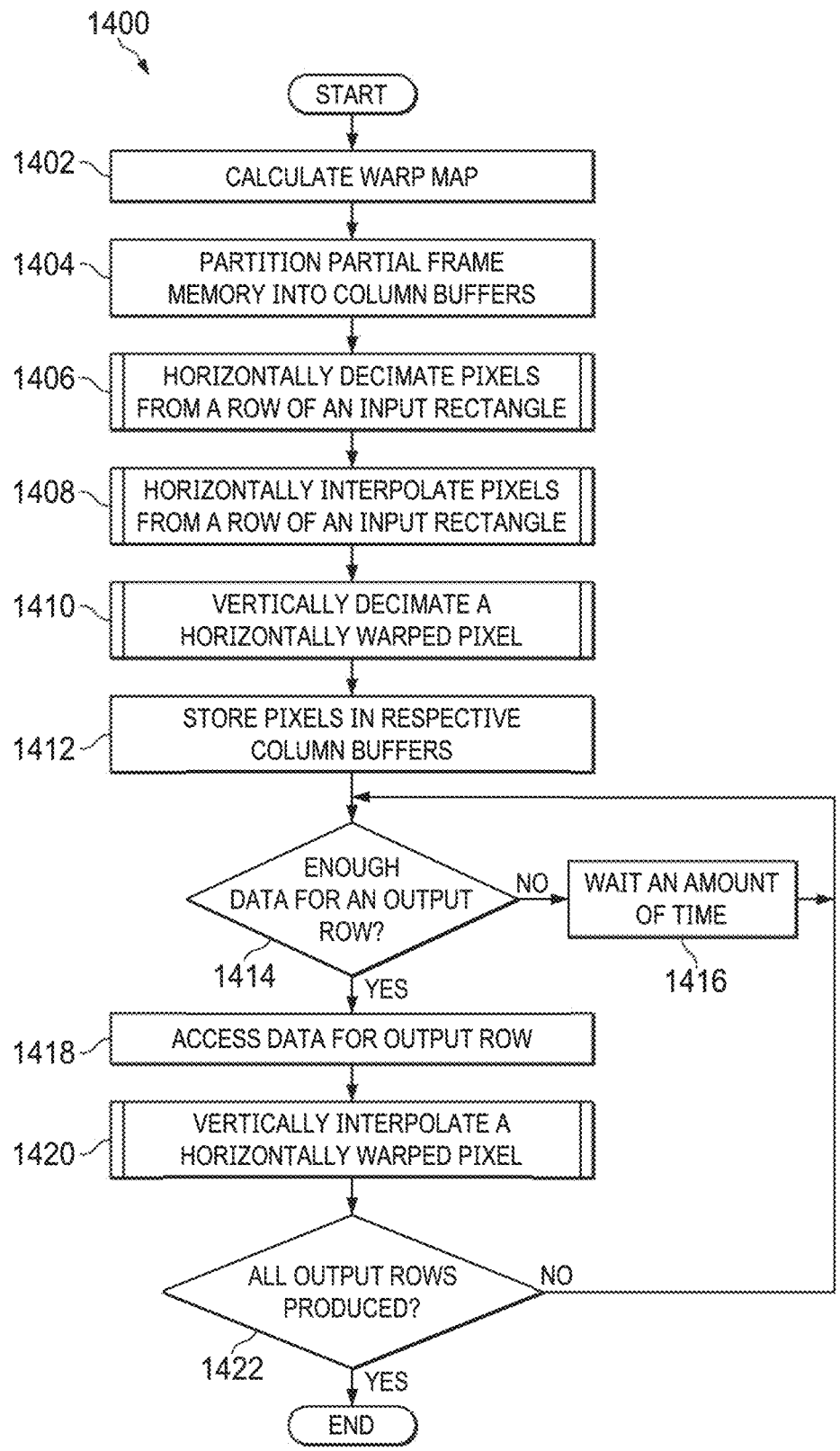
FIG. 14 is a flowchart representative of example machine readable instructions that may be executed by example processor circuitry to implement the warper circuitry of FIG. 4.

FIG. 14 is a flowchart representative of example machine readable instructions and/or example operations 1400 that may be executed and/or instantiated by processor circuitry to warp images for video processing. The machine readable instructions and/or operations 1400 of FIG. 14 begin when the example warp map circuitry 504 of FIG. 5 calculates the horizontal component of a full warp map and the example warp map circuitry 504 of FIG. 6 calculates the vertical component of a full warp map. (Block 1402). The respective circuitries use the sparse warp map provided by the example configuration circuitry 408 to calculate the full warp map using bilinear interpolation. In examples where the sparse warp map contains input rectangles width dimensions that are a power of two, the example warp map circuitry 504 of FIG. 5 and warp map circuitry 604 of FIG. 6 performs the bilinear interpolation without the use of weights or division operations.

The example vertical output buffer circuitry 606 partitions the example partial frame memory 420 into FIFO column buffers. (Block 1404). The example vertical output buffer circuitry 606 uses the vertical component of the full warp map to determine the lengths of each column and partitions the example partial frame memory 420 such that each FIFO column buffer is the minimum size required to hold the pixels necessary to create the corresponding column of the output image 406.

The example horizontal decimator circuitry 502 decimates a group of pixels corresponding to a row from a rectangle of the input image 404. (Block 1406). To decimate a group of pixels, the example horizontal decimator circuitry 502 determines whether a subset of pixels should be removed from the group. If necessary, the horizontal decimator circuitry additionally determines which subset of pixels from the group should be removed. Block 1406 is explored further in FIG. 15.

The example horizontal interpolator circuitry 508 horizontally interpolates a group of pixels corresponding to a row from a rectangle of the input image 404. (Block 1408). To horizontally interpolate a group of pixels, the example horizontal interpolator circuitry 508 receives the group of pixels after they have been processed by the example horizontal decimator circuitry 502 at block 1406. The example horizontal decimator circuitry 502 then determines which groups of pixels require interpolation and execute an interpolation function so the pixels match the width of the corresponding row of the corresponding quadrilateral. Block 1408 is explored further in FIG. 16. After a pixel has been processed by both the example horizontal decimator circuitry 502 and the example horizontal interpolator circuitry 508, it is considered horizontally warped.

The example vertical decimator circuitry 602 vertically decimates a horizontally warped pixel. (Block 1410). To vertically decimate a horizontally warped pixel, the example vertical decimator circuitry 602 determines whether the pixel belongs to a column of a rectangle on the input image 404 whose height is greater than the height of the corresponding column of the corresponding quadrilateral on the output image 406. The example vertical decimator circuitry 602 makes the determination of block 1410 according to the vertical component of a full warp map. Block 1410 is explored further in FIG. 15.

The example vertical output buffer circuitry 606 stores pixels that have not been removed by the example vertical decimator circuitry 602 into their respective FIFO column buffers. (Block 1412). Because the input image 404 is horizontally warped in raster order, the vertical decimator receives and processes pixels in a raster order as well. The example vertical output buffer circuitry 606 determines which column a given pixel provided by the example vertical decimator circuitry 602 belongs to and communicates with the example data controller circuitry 418 to store the pixel into the appropriate FIFO column buffer in example partial frame memory 420.

The example vertical output buffer circuitry 606 determines whether there is enough data in the example partial frame memory 420 to produce an output row. (Block 1414). The example vertical output buffer circuitry 606 uses the vertical component of the full warp map to determine what data is required to produce a given output row. This determination occurs by comparing the number of elements in a given FIFO column buffer in the example partial frame memory 420 to the number of elements for the given output row as indicated by the full warp map.

If the example vertical output buffer circuitry 606 determines there is not enough data in the example partial frame memory 420 to produce an output row, the example vertical interpolator circuitry 608 waits an amount of time without processing data. (Block 1416). In some examples, the amount of time of block 1416 corresponds to the amount of time it takes for any amount of additional amount of data to enter the example partial frame memory 420. In other examples, the amount of time of block 1416 corresponds amount of time it takes for a threshold amount of data to enter the example partial frame memory 420. In other examples, the amount of time of block 1416 corresponds to a regular interval (e.g., every n milliseconds) and does not depend on the amount of data that enters the example partial frame memory 420 within the time frame. After the example vertical interpolator circuitry 608 waits the amount of time, the machine readable instructions and/or operations 1400 returns to block 1414, where the example vertical output buffer circuitry 606 re-checks whether enough data is present to produce an output row.

If enough data is present within the example partial frame memory 420 to produce an output row, the example vertical interpolator circuitry 608 accesses the data required to produce said output row. (Block 1418). The example vertical interpolator circuitry 608 accesses the data from the example partial frame memory 420 in a FIFO pattern via the example vertical output buffer circuitry 606 and the example data controller circuitry 418.

The example vertical interpolator circuitry 608 vertically interpolates a horizontally warped pixel. (Block 1420). To produce an output row, the vertical interpolator circuitry determines which pixels from the data accessed in block 1418 require vertical interpolation. The example vertical interpolator circuitry 608 then performs the interpolation according to the vertical component of a full warp map. After the example vertical interpolator circuitry 608 has vertically interpolated all pixels that require vertical interpolation within the data set of block 1418, the pixels from block 1418 have been fully warped and a row of the output image 406 is produced. Block 1420 is explored further in FIG. 16.

The example vertical interpolator circuitry 608 determines whether all output rows have been produced. (Block 1422). To make the determination of block 1422, the example vertical interpolator circuitry 608 uses the full component of the warp map to determine how many rows are present in the output image 406 and compares it to the number of rows produced. If the example vertical interpolator circuitry 608 determines all output rows of the output image 406 have not been produced, the machine readable instructions and/or operations 1400 returns to block 1414 where the example vertical output buffer circuitry 606 re-checks whether enough data is present to produce an additional output row. If the example vertical interpolator circuitry 608 determines all output rows of the output image 406 have been produced, the fully warped output image 406 has been produced and the machine readable instructions and/or operations 1400 end.

The machine readable instructions and/or operations 1400 may repeat each of blocks 1406, block 1408, block 1410, block 1412, and block 1420 concurrently. For example, the example vertical interpolator circuitry 608 may vertically interpolate pixels to produce a first output row, the example vertical output buffer circuitry 606 may store horizontally warped pixels from a first quadrilateral of a second output row, the example vertical decimator circuitry 602 may vertically decimate pixels from a second quadrilateral of the second output row, the example horizontal interpolator circuitry 508 may horizontally interpolate a third quadrilateral of the second output row, and the horizontal decimator circuitry may horizontally decimate a fourth quadrilateral of the second output row simultaneously. As a result, the warper circuitry 400 may continuously access, horizontally warp, and vertically warp pixel data in raster scan order until every row of the output image 406 has been produced. In some examples, the machine readable instructions and/or operations 1400 may be implemented across multiple processors or machines executing in parallel to concurrently implement each of blocks 1406, block 1408, block 1410, block 1412, and block 1420. Furthermore, in examples where additional images require warping after the input image 404, such as video applications where each image is a frame of video, the machine readable instructions and/or operations 1400 may continuously repeat in the foregoing manner until every image is warped.

Figure 15:
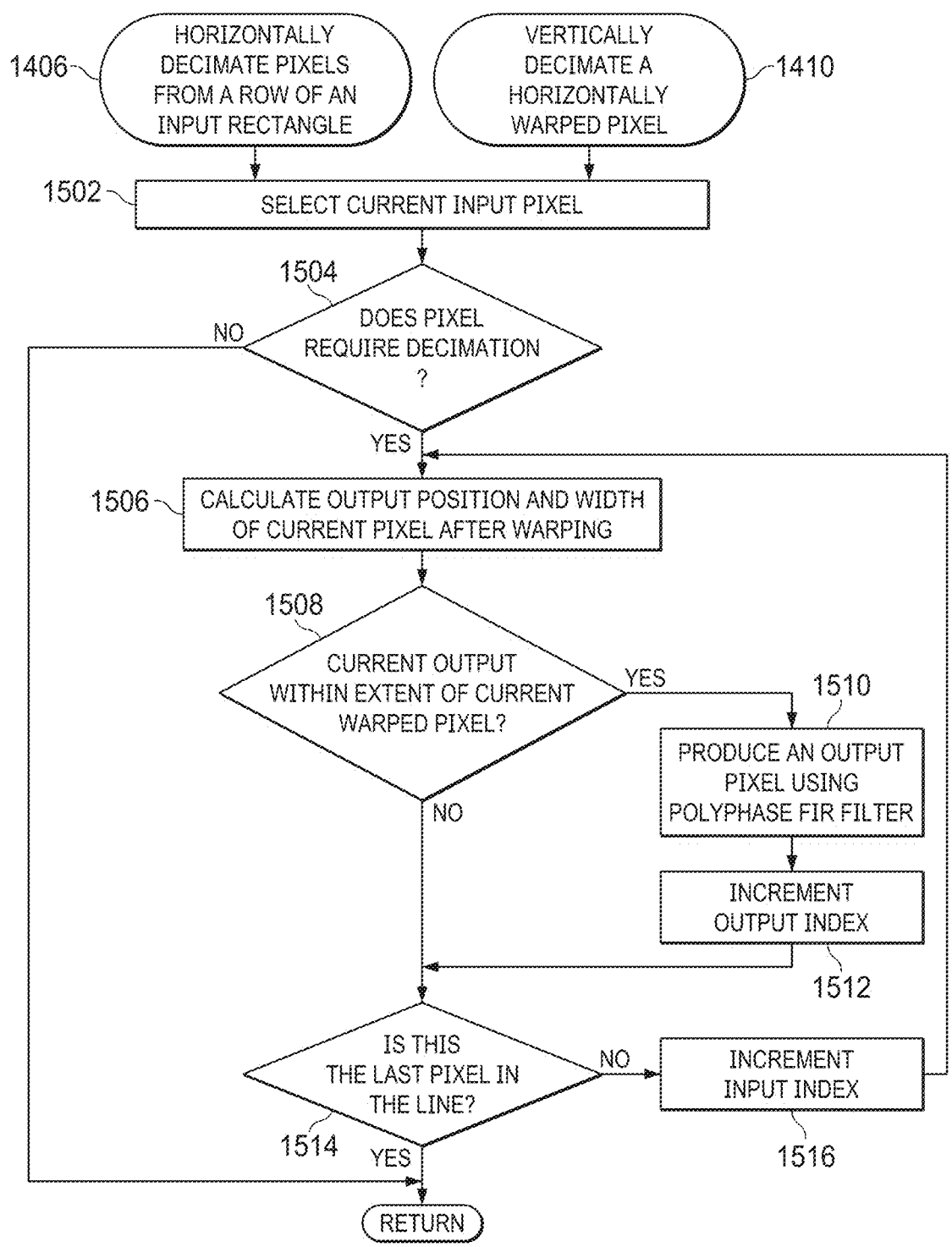
FIG. 15 is a flowchart of example machine readable instructions that may be executed by example processor circuitry to implement the horizontal decimator circuitry of FIG. 5 or the vertical decimator of FIG. 6.

FIG. 15 is a flowchart of example machine readable instructions that may be executed by example processor circuitry to implement the horizontal decimator circuitry of FIG. 5 or the vertical decimator of FIG. 6. Specifically, the flowchart of FIG. 15 shows how the machine readable instructions and/or operations of block 1406 and block 1410 perform decimation. The machine readable instructions and/or operations of block 1406 and block 1410 begin when the respective circuitry selects a current pixel. (Block 1502). As used in reference to FIG. 15, "respective circuitry" refers to the example horizontal decimator circuitry 502 for block 1406 and example vertical decimator circuitry 602 for block 1410. In block 1406, the current pixel block 1502 refers to pixel from a row of an input rectangle. In block 1410, the current pixel of block 1502 refers to a pixel from a column an input rectangle.

The respective circuitry determines whether the row/column of the input rectangle that contains the current input pixel requires decimation. (Block 1504). To make the determination of block 1504, the respective circuitry determines whether the width/height of the row/column from the input rectangle is greater than the width/height of the row/column of the corresponding output quadrilateral. If the width/height of the row/column from the input rectangle is greater than the width/height of the row/column of the corresponding output quadrilateral, the row/column of the input rectangle current pixel requires decimation and the machine readable instructions and/or operations of block 1406 and block 1410 proceed to block 1506. If the row/column of the input rectangle does not require decimation, the machine readable instructions and/or operations of block 1406 and block 1410 return to block 1408 and block 1412 respectively from FIG. 14.

The respective circuitry calculates the center position and width/height of the current pixel after warping. (Block 1506). The center position and width/height of an output position refers to where the current pixel would be located in the output image 406. For example, suppose a rectangle on the input image 404 has 10 pixels in a given row, and the corresponding row of the corresponding quadrilateral in the output image 406 has 5 pixels. The respective circuitry may describe the 5 output pixels as having center positions [0.5, 1.5, 2.5, 3.5, 4.5] and each pixel having a total width of 1. The respective map circuitry may further describe the 10 input pixels in the same coordinate system of the output pixels. For example, the 10 input pixels would have center positions [0.25, 0.75, 1.25, . . . , 4.75] and each pixel would have a total width of 0.5. For block 1412, the pixels in a given column would each be described with a center position and a height rather than a width. In general, input pixels processed in a decimation process will have a width/height less than 1 because there are more input pixels in a given row/column of an input rectangle than there are output pixels in the corresponding row/column of the corresponding output quadrilateral.

The respective circuitry determines whether the current input pixel contains the center of the current output pixel. (Block 1508). For example, supposed the current input pixel is the first of the 10 input pixels in the foregoing example. The current input pixel would have a center position of 0.25 and a width/height of 0.5. As a result, the edge of the current input pixel is located at 0.5 (calculated by adding the pixel center to half of the pixel width/height). In this example, the current output pixel may start with the first of the output pixels, which has a center position of 0.5. Therefore, in this example, the respective circuitry determines the current input pixel does contain the center of the current output pixel.

If the respective circuitry determines the current input pixel does not contain the center of the current output pixel, the machine readable instructions and/or operations of block 1408 and block 1412 removes the current input pixel proceed to block 1514 without sampling. If the respective circuitry determines the current input pixel does contain the center of the current output pixel, the respective circuitry samples the current input pixel using a polyphase Finite Impulse Response (FIR) filter. (Block 1510). This sampling may be referred to as decimation.

The respective circuitry updates output index. (Block 1512). The respective circuitry updates the current output pixel index to be the next output pixel in the row or column of the quadrilateral of the output image 406 corresponding to the row or column of the rectangle of the input image 404. In the foregoing example, the current output pixel becomes the pixel with a center position of 1.5. The machine readable instructions and/or operations of block 1408 and block 1412 then proceed to block 1514.

The respective circuitry determines whether the current input pixel is the last pixel in the row or column of the corresponding input rectangle. (Block 1514). If the current input pixel is the last pixel in the row or column of the corresponding input rectangle, the example machine readable instructions and/or operations of block 1408 and block 1412 return to block 1410 and block 1414 of FIG. 14. If the current input pixel is not the last pixel in the row or column of the corresponding input rectangle, the example machine readable instructions and/or operations of block 1408 and block 1412 proceed to block 1516.

The respective circuitry updates the current pixel. (Block 1516). The respective circuitry updates the current pixel to be the next pixel in the row or column of the corresponding input rectangle. The machine readable instructions and/or operations then continue at block 1506, where, in the foregoing example, the respective circuitry determines the current input pixel becomes the pixel with a center position of 0.75. When the respective circuitry determines the edge of the current input pixel again at block 1508, it calculates (0.75+0.5/2) to determine the edge of the current input pixel is at 1.0. The edge of the current input pixel does not include the center of the current output pixel at 1.5, so the respective circuitry removes the current input pixel and returns to block 1514 without executing block 1510 or block 1512 again. The machine readable instructions and/or operations of block 1408 and block 1412 loop in this manner until every pixel in the row or column of the corresponding input rectangle has been considered.

Figure 16:
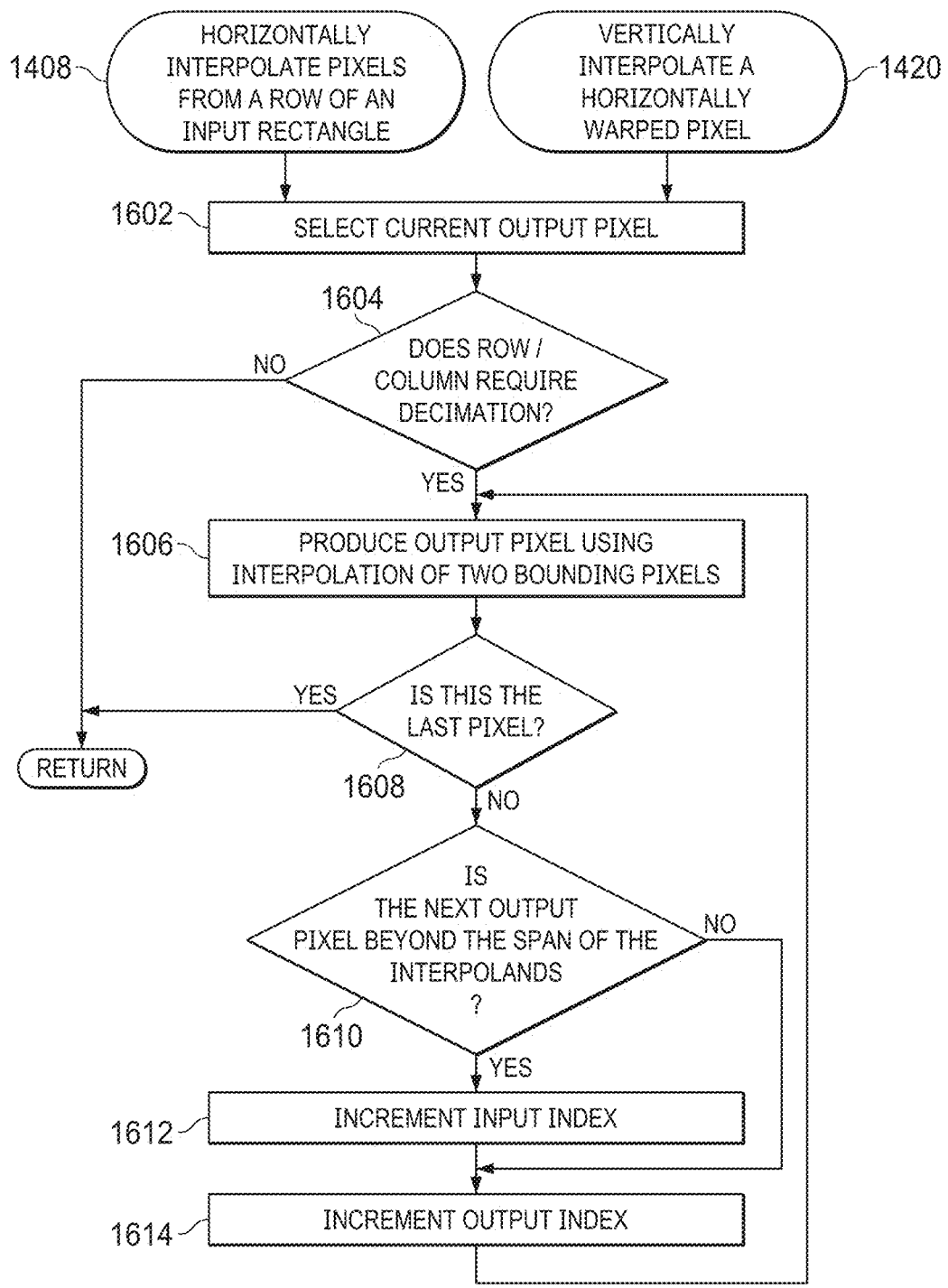
FIG. 16 is a flowchart of example machine readable instructions that may be executed by example processor circuitry to implement the horizontal interpolator circuitry of FIG. 5 or the vertical interpolator of FIG. 6.

FIG. 16 is a flowchart of example machine readable instructions that may be executed by example processor circuitry to implement the horizontal interpolator circuitry of FIG. 6 or the vertical interpolator of FIG. 6. Specifically, the flowchart of FIG. 16 shows how the machine readable instructions and/or operations of block 1408 and block 1420 perform interpolation. The machine readable instructions and/or operations of block 1408 and block 1420 begin when the respective circuitry selects a current input pixel. (Block 1602). As used in reference to FIG. 16, "respective circuitry" refers to the example horizontal interpolator circuitry 308 for block 1408 and example vertical interpolator circuitry 608 for block 1420. In block 1408, the current pixel of block 1202 refers to pixel from a row of an input rectangle. In block 1420, the current pixel of block 1602 refers to a pixel from a column an input rectangle.

The respective circuitry determines whether the row/column of the input rectangle that contains the current input pixel requires interpolation. (Block 1604). To make the determination of block 1604, the respective circuitry determines whether the width/height of the row/column from the input rectangle is less than the width/height of the row/column of the corresponding output quadrilateral. If the width/height of the row/column from the input rectangle is less than the width/height of the row/column of the corresponding output quadrilateral, the row/column of the input rectangle current pixel requires interpolation and the machine readable instructions and/or operations of block 1408 and block 1420 proceed to block 1206. If the row/column of the input rectangle does not require interpolation, the machine readable instructions and/or operations of block 1408 and block 1420 return to block 1410 and block 1422 respectively from FIG. 14.

The respective circuitry produces an output pixel using the interpolation of two input bounding pixels. (Block 1606). For example, suppose a quadrilateral in the output image 406 has 10 pixels according to the full warp map. The respective circuitry may describe the 10 output pixels as having center positions [0.5, 1.5, 2.5, . . . , 9.5] and each pixel having a total width of 1. The respective map circuitry may further describe input pixels from the corresponding input rectangle in the same coordinate system of the output pixels. For example, suppose the input pixels have center positions [0.25, 3.25, 6.25 9.25] and each pixel having a total width of 3. In general, input pixels processed in an interpolation process will have a width/height greater than 1 because there are fewer input pixels in a given row/column of an input rectangle than there are output pixels in the corresponding row/column of the corresponding output quadrilateral. If the current output pixel has a center of 0.5, the respective circuitry may interpolate the pixel data of two bounding input pixels with center positions of 0.25 and 3.25 to determine pixel data for the current output pixel. The respective circuitry may use a 2-tap polyphase FIR filter to perform the interpolation and determine the pixel data for the current output pixel. This interpolation is possible because the current output pixel, which stretches from 0 to 1 in the output coordinate space, is overlapped by the two bounding pixels that stretch from −1.25 to 1 0.75 and 1.75 to 4.75 in output coordinate space respectively.

The respective circuitry determines whether the output pixel is the last pixel in the row/column of the output quadrilateral. (Block 1608). If the respective circuitry determines the output pixel is the last pixel in the row/column of the output quadrilateral, the machine readable instructions and/or operations of block 1408 and block 1420 return to block 1410 and block 1422, respectively.

If the respective circuitry determines the output pixel is not the last pixel in the row/column of the output quadrilateral, the respective circuitry determines whether the next output pixel is beyond the span of the two bounding input pixels. (Block 1610). In the foregoing example, the next output pixel of 1.5 is between the center of the two bounding pixels, so the next output pixel is not beyond the span of the bounding input pixels.

If the respective circuitry determines the next output pixel is not beyond the span of the two bounding input pixels, the respective circuitry updates the current output pixel to be the next output pixel (Block 1614) (i.e., in the foregoing example, the output pixel with center 1.5). The machine readable instructions and/or operations of block 1408 and block 1420 then proceed to block 1206 where the respective circuitry determines pixel data for the next output pixel using the same two input pixels as bounding pixels.

Figure 17:
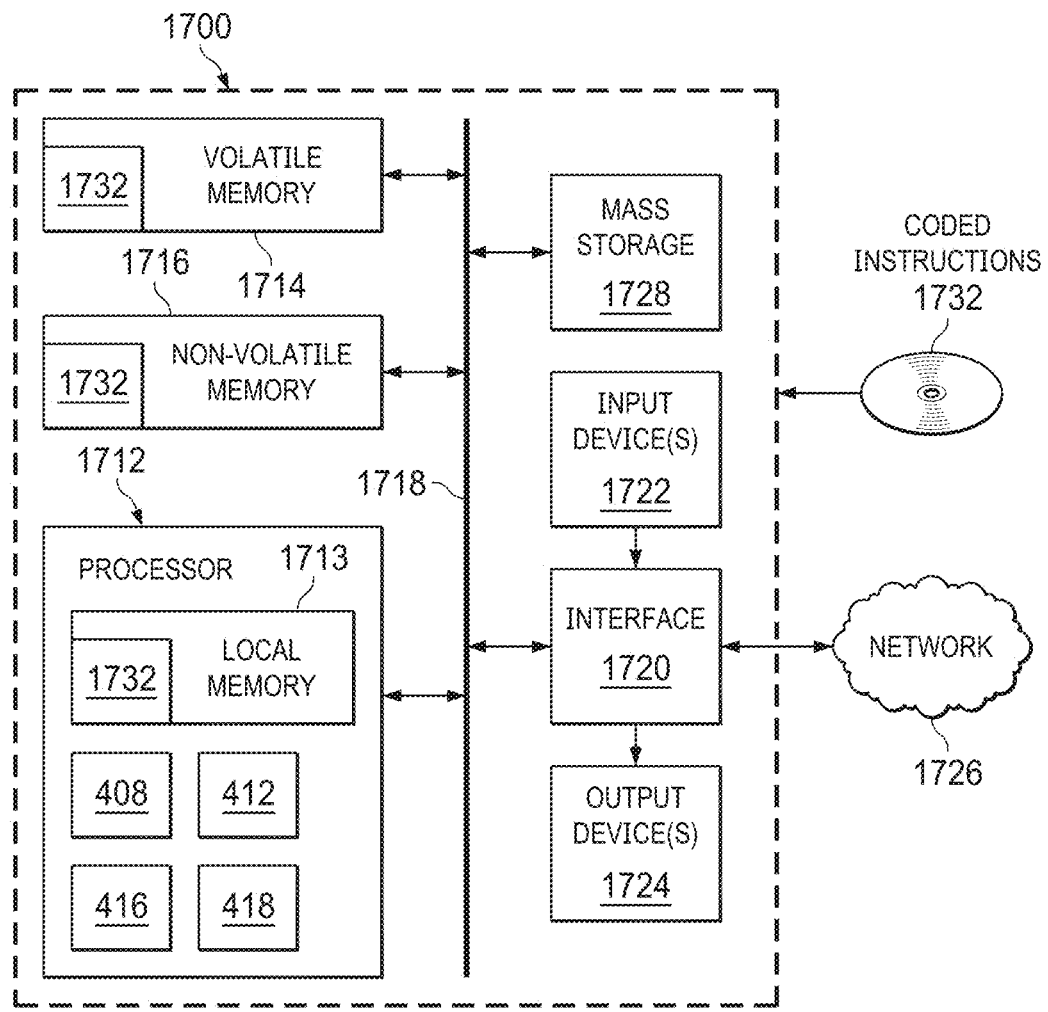
FIG. 17 is a block diagram of an example processing platform including processor circuitry structured to execute the example machine readable instructions of FIGS. 12-16 to implement the warper circuitry of FIG. 4.

If the respective circuitry determines the next output pixel is beyond the span of the two bounding input pixels, the respective circuitry updates the two bounding input pixels. (Block 1612). In the foregoing example, the first execution of block 1612 would make the two input bounding pixels the pixels with center positions of 3.25 and 6.25. The machine readable instructions and/or operations of block 1408 and block 1420 continue to block 1614 where the respective circuitry updates the current output pixel. Through this manner, the machine readable instructions and/or operations of block 1408 and block 1420 loop to produce multiple output pixels for a given set of two input FIG. 17 is a block diagram of an example processor platform 1700 structured to execute and/or instantiate the machine readable instructions and/or operations of FIGS. 12-16 to implement the warper circuitry 400 of FIG. 4. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements example configuration circuitry 408, example horizontal warper circuitry 412, example vertical warper circuitry 416, and example data controller circuitry 418.

The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1722 are connected to the interface circuitry 1720. The input device(s) 1722 permit(s) a user to enter data and/or commands into the processor circuitry 1712. The input device(s)

1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output devices 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1732, which may be implemented by the machine readable instructions of FIGS. 12-16 may be stored in the mass storage device 1728, in the volatile memory 1714, in the non-volatile memory 1716, and/or on a removable non-transitory computer readable storage medium such as a CD or DVD.

Figure 18:
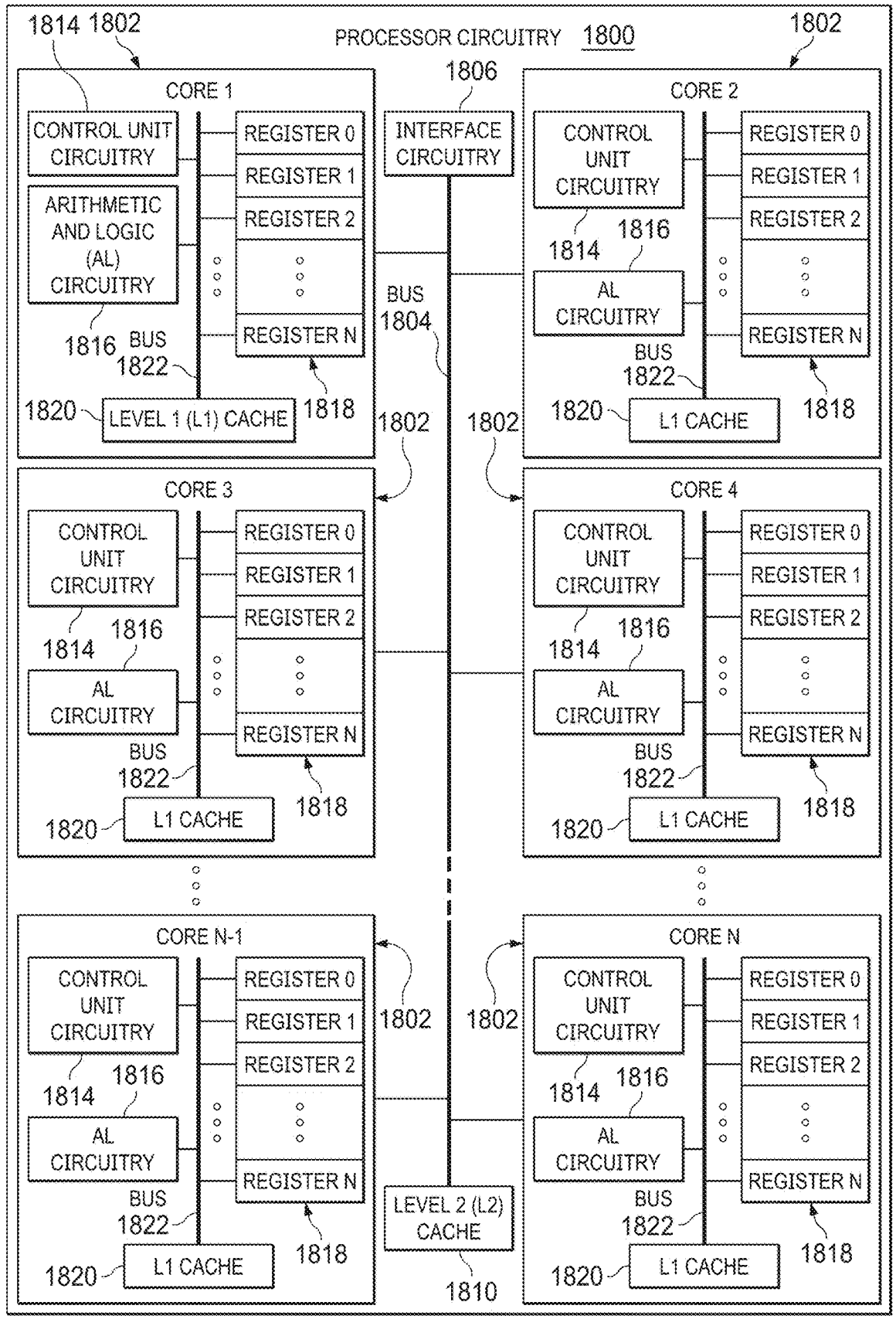
FIG. 18 is a block diagram of an example implementation of the processor circuitry of FIG. 17.

FIG. 18 is a block diagram of an example implementation of the processor circuitry 1712 of FIG. 17. In this example, the processor circuitry 1712 of FIG. 17 is implemented by a microprocessor 1800. For example, the microprocessor 1800 may implement multi-core hardware circuitry such as a CPU, a DSP, a GPU, an XPU, etc. Although it may include any number of example cores 1802 (e.g., 1 core), the microprocessor 1800 of this example is a multi-core semiconductor device including N cores. The cores 1802 of the microprocessor 1800 may operate independently or may cooperate to execute machine readable instructions. For example, machine code corresponding to a firmware program, an embedded software program, or a software program may be executed by one of the cores 1802 or may be executed by multiple ones of the cores 1802 at the same or different times. In some examples, the machine code corresponding to the firmware program, the embedded software program, or the software program is split into threads and executed in parallel by two or more of the cores 1802. The software program may correspond to a portion or all of the machine readable instructions and/or operations represented by the flowchart of FIGS. 12-16.

The cores 1802 may communicate by an example bus 1804. In some examples, the bus 1804 may implement a communication bus to effectuate communication associated with one(s) of the cores 1802. For example, the bus 1804 may implement at least one of an Inter-Integrated Circuit (I2C) bus, a Serial Peripheral Interface (SPI) bus, a PCI bus, or a PCIe bus. Additionally or alternatively, the bus 1804 may implement any other type of computing or electrical bus. The cores 1802 may obtain data, instructions, and/or signals from one or more external devices by example interface circuitry 1806. The cores 1802 may output data, instructions, and/or signals to the one or more external devices by the interface circuitry 1806. Although the cores 1802 of this example include example local memory 1820 (e.g., Level 1 (L1) cache that may be split into an L1 data cache and an L1 instruction cache), the microprocessor 1800 also includes example shared memory 1810 that may be shared by the cores (e.g., Level 2 (L2_ cache)) for high-speed access to data and/or instructions. Data and/or instructions may be transferred (e.g., shared) by writing to and/or reading from the shared memory 1810. The local memory 1820 of each of the cores 1802 and the shared memory 1810 may be part of a hierarchy of storage devices including multiple levels of cache memory and the main memory (e.g., the main memory 1714, 1716 of FIG. 17). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1802 may be referred to as a CPU, DSP, GPU, etc., or any other type of hardware circuitry. Each core 1802 includes control unit circuitry 1814, arithmetic and logic (AL) circuitry (sometimes referred to as an ALU) 1816, a plurality of registers 1818, the L1 cache 1820, and an example bus 1822. Other structures may be present. For example, each core 1802 may include vector unit circuitry, single instruction multiple data (SIMD) unit circuitry, load/store unit (LSU) circuitry, branch/jump unit circuitry, floating-point unit (FPU) circuitry, etc. The control unit circuitry 1814 includes semiconductor-based circuits structured to control (e.g., coordinate) data movement within the corresponding core 1802. The AL circuitry 1816 includes semiconductor-based circuits structured to perform one or more mathematic and/or logic operations on the data within the corresponding core 1802. The AL circuitry 1816 of some examples performs integer based operations. In other examples, the AL circuitry 1816 also performs floating point operations. In yet other examples, the AL circuitry 1816 may include first AL circuitry that performs integer based operations and second AL circuitry that performs floating point operations. In some examples, the AL circuitry 1816 may be referred to as an Arithmetic Logic Unit (ALU). The registers 1818 are semiconductor-based structures to store data and/or instructions such as results of one or more of the operations performed by the AL circuitry 1816 of the corresponding core 1802. For example, the registers 1818 may include vector register(s), SIMD register(s), general purpose register(s), flag register(s), segment register(s), machine specific register(s), instruction pointer register(s), control register(s), debug register(s), memory management register(s), machine check register(s), etc. The registers 1818 may be arranged in a bank as shown in FIG. 18. Alternatively, the registers 1818 may be organized in any other arrangement, format, or structure including distributed throughout the core 1802 to shorten access time. The bus 1820 may implement at least one of an I2C bus, a SPI bus, a PCI bus, or a PCIe bus.

Each core 1802 and/or, more generally, the microprocessor 1800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 19:
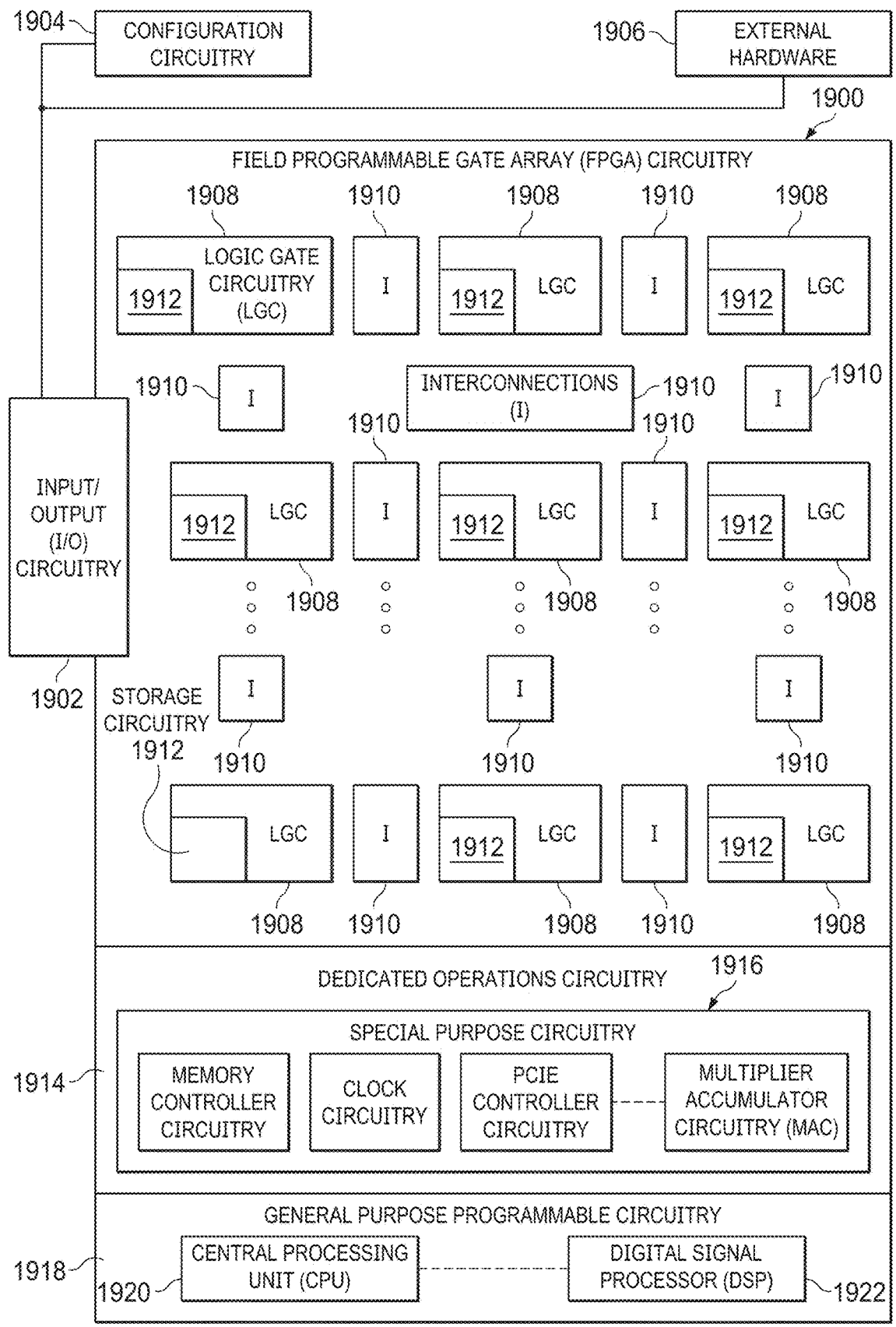
FIG. 19 is a block diagram of another example implementation of the processor circuitry of FIG. 17.

FIG. 19 is a block diagram of another example implementation of the processor circuitry 1712 of FIG. 17. In this example, the processor circuitry 1712 is implemented by FPGA circuitry 1900. The FPGA circuitry 1900 can be used, for example, to perform operations that could otherwise be performed by the example microprocessor 1800 of FIG. 18 executing corresponding machine readable instructions. However, once configured, the FPGA circuitry 1900 instantiates the machine readable instructions in hardware and, thus, can often execute the operations faster than they could be performed by a general purpose microprocessor executing the corresponding software.

More specifically, in contrast to the microprocessor 1800 of FIG. 18 described above (which is a general purpose device that may be programmed to execute some or all of the machine readable instructions represented by the flowcharts of FIGS. 12-16 but whose interconnections and logic circuitry are fixed once fabricated), the FPGA circuitry 1900 of the example of FIG. 19 includes interconnections and logic circuitry that may be configured and/or interconnected in different ways after fabrication to instantiate, for example, some or all of the machine readable instructions represented by the flowcharts of FIGS. 12-16. In particular, the FPGA 1900 may be thought of as an array of logic gates, interconnections, and switches. The switches can be programmed to change how the logic gates are interconnected by the interconnections, effectively forming one or more dedicated logic circuits (unless and until the FPGA circuitry 1900 is reprogrammed). The configured logic circuits enable the logic gates to cooperate in different ways to perform different operations on data received by input circuitry. Those operations may correspond to some or all of the software represented by the flowcharts of FIGS. 12-16. As such, the FPGA circuitry 1900 may be structured to effectively instantiate some or all of the machine readable instructions of the flowcharts of FIGS. 12-16 as dedicated logic circuits to perform the operations corresponding to those software instructions in a dedicated manner analogous to an ASIC. Therefore, the FPGA circuitry 1900 may perform the operations corresponding to the some or all of the machine readable instructions of flowcharts of FIGS. 12-16 faster than the general purpose microprocessor can execute the same.

In the example of FIG. 19, the FPGA circuitry 1900 is structured to be programmed (and/or reprogrammed one or more times) by an end user by a hardware description language (HDL) such as Verilog. The FPGA circuitry 1900 of FIG. 19, includes example input/output (I/O) circuitry 1902 to obtain and/or output data to/from example configuration circuitry 1904 and/or external hardware (e.g., external hardware circuitry) 1906. For example, the configuration circuitry 1904 may implement interface circuitry that may obtain machine readable instructions to configure the FPGA circuitry 1900, or portion(s) thereof. In some such examples, the configuration circuitry 1904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1906 may implement the microprocessor 1800 of FIG. 18. The FPGA circuitry 1900 also includes an array of example logic gate circuitry 1908, a plurality of example configurable interconnections 1910, and example storage circuitry 1912. The logic gate circuitry 1908 and interconnections 1910 are configurable to instantiate one or more operations that may correspond to at least some of the machine readable instructions of FIGS. 12-16 and/or other desired operations. The logic gate circuitry 1508 shown in FIG. 19 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1908 to enable configuration of the electrical structures and/or the logic gates to form circuits to perform desired operations. The logic gate circuitry 1908 may include other electrical structures such as look-up tables (LUTs), registers (e.g., flip-flops or latches), multiplexers, etc.

The interconnections 1910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1908 to program desired logic circuits.

The storage circuitry 1912 of the illustrated example is structured to store result(s) of the one or more of the operations performed by corresponding logic gates. The storage circuitry 1912 may be implemented by registers or the like. In the illustrated example, the storage circuitry 1912 is distributed amongst the logic gate circuitry 1908 to facilitate access and increase execution speed.

The example FPGA circuitry 1900 of FIG. 19 also includes example Dedicated Operations Circuitry 1914. In this example, the Dedicated Operations Circuitry 1914 includes special purpose circuitry 1916 that may be invoked to implement commonly used functions to avoid the need to program those functions in the field. Examples of such special purpose circuitry 1916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1900 may also include example general purpose programmable circuitry 1918 such as an example CPU 1920 and/or an example DSP 1922. Other general purpose programmable circuitry 1918 may additionally or alternatively be present such as a GPU, an XPU, etc., that can be programmed to perform other operations.

Although FIGS. 18 and 19 illustrate two example implementations of the processor circuitry 1712 of FIG. 17, many other approaches are contemplated. For example, as mentioned above, modern FPGA circuitry may include an on-board CPU, such as one or more of the example CPU 1920 of FIG. 19. Therefore, the processor circuitry 1712 of FIG. 17 may additionally be implemented by combining the example microprocessor 1800 of FIG. 18 and the example FPGA circuitry 1900 of FIG. 19. In some such hybrid examples, a first portion of the machine readable instructions represented by the flowcharts of FIGS. 12-16 may be executed by one or more of the cores 142 of FIG. 18 and a second portion of the machine readable instructions represented by the flowcharts of FIGS. 12-16 may be executed by the FPGA circuitry 1900 of FIG. 19.

In some examples, the processor circuitry 1712 of FIG. 17 may be in one or more packages. For example, the processor circuitry 1800 of FIG. 18 and/or the FPGA circuitry 1900 of FIG. 19 may be in one or more packages. In some examples, an XPU may be implemented by the processor circuitry 1712 of FIG. 17, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that warp images for video processing. The disclosed systems, methods, apparatus, and articles of manufacture improve the efficiency of using a computing device by reducing latency and memory requirements through the separation of decimation and interpolation operations and implementation of dynamically sized column buffers in partial frame memory. The disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference, with each claim standing on its own as a separate embodiment of the present disclosure.

What is claimed is:

1. A device comprising:
   first warper circuitry configured to:
   obtain an input image;
   obtain a warp map;
   in response to determining that a first group of pixels of the input image has a number of pixels greater than a first value:
   decimate the first group of pixels responsive to the warp map, to produce a second group of pixels, the first group of pixels in a first direction; and
   set a first warped image in a first direction to contain the second group of pixels; and
   in response to determining that the first group of pixels of the input image has a number of pixels less than the first value:
   set the second group of pixels to the first group of pixels; and
   produce the first warped image based on interpolating the second group of pixels responsive to the warp map; and
   second warper circuitry configured to:
   obtain the first warped image;
   obtain the warp map;
   in response to determining that a third group of pixels of the first warped image has a number of pixels greater than a second value;
   decimate the third group of pixels, responsive to the warp map, to produce a fourth group of pixels, the third group of pixels in a second direction; and
   set an output image to contain the fourth group of pixels; and
   in response to determining that the third group of pixels of the input image has a number of pixels less than the second value:
   set the fourth group of pixels to the second third group of pixels; and
   produce the output image based on interpolating the fourth group of pixels responsive to the warp map.

2. The device of claim 1, further including:
   configuration circuitry to partition the input image into a first plurality of rectangles; and
   warp map circuitry configured to partition the output image into a second plurality of rectangles based on the first plurality of rectangles, the second plurality of rectangles based on a bilinear interpolation that includes a shift operation.

3. The device of claim 2, wherein the warp map circuitry is to further partition the output image into a plurality of quadrilaterals such that:
   each rectangle from the second plurality of rectangles corresponds to a quadrilateral; and
   the second plurality of rectangles and the corresponding quadrilaterals are used to determine which pixels are decimated and interpolated.

4. The device of claim 1, wherein to decimate and interpolate pixels, the first warper circuitry and the second warper circuitry are to implement separate polyphase filters for decimation and interpolation.

5. A method comprising:
   decimating, by decimator circuitry, an input image in a direction, based on a warp map, to produce a decimated image;
   partitioning a partial frame of memory into buffers based on the warp map;
   storing pixel data from the decimated image in the buffers;
   retrieving the decimated image from the buffer to produce a retrieved image; and
   interpolating, by interpolator circuitry, the retrieved image in the direction, based on the warp map, to produce an output image.

6. The method of claim 5, further including partitioning the partial frame of memory such that the buffers have a minimum length required to store the decimated image.

7. The method of claim 5, further including interpolating the retrieved image in a First In First Out pattern.

8. The method of claim 5, further including:
   partitioning the input image into a first plurality of rectangles; and
   partitioning the output image into a second plurality of rectangles based on the first plurality of rectangles, the second plurality of rectangles based on a bilinear interpolation that includes a shift operation.

9. The method of claim 8, further including partitioning the output image into a plurality of quadrilaterals such that:
   each rectangle from the second plurality of rectangles corresponds to a quadrilateral; and
   the second plurality of rectangles and the corresponding quadrilaterals are used to determine which pixels are decimated and interpolated.

10. The method of claim 5, further including implementing separate polyphase filters to decimate the input image and interpolate the retrieved image.

11. The method of claim 5, wherein the decimating and the interpolating are mutually exclusive.

12. The method of claim 5, wherein projecting the output image is by a projector, a Virtual Reality headset, or an Augmented Reality headset.

13. A method comprising:
- obtaining, by warper circuitry, an input image;
- obtaining, by the warper circuitry, a warp map;
- warping, by the warper circuitry, the input image in a first direction to produce a first warped image, wherein the first direction is horizontal or vertical, and wherein warping the input image in a first direction comprises:
  - decimating pixels a first subset of rows or columns of the input image, responsive to the warp map, to produce a decimated image; and
  - interpolating a second subset of rows or columns of the decimated image, responsive to the warp map, to produce the first warped image, wherein the first subset of rows or columns and the second subset of rows or columns are mutually exclusive;
- warping, by the warper circuitry, the first warped image in a second direction, responsive to the warp map, to produce an output image, wherein the second direction is horizontal or vertical, and wherein the second direction is different than the first direction; and
- projecting the output image to produce a projected image.

14. The method of claim 13, wherein the projected image is a foveated rendering of the input image and a first aspect ratio corresponding to the input image matches a second aspect ratio corresponding to the projected image.

15. The method of claim 13, wherein the warper circuitry comprises an Application Specific Integrated Circuit (ASIC).

16. The method of claim 13, further including:
- partitioning the input image into a first plurality of rectangles; and
- partitioning the output image into a second plurality of rectangles based on the first plurality of rectangles, the second plurality of rectangles based on a bilinear interpolation that includes a shift operation.

17. The method of claim 16, further including partitioning the output image into a plurality of quadrilaterals such that:
- each rectangle from the second plurality of rectangles corresponds to a quadrilateral; and
- the second plurality of rectangles and the corresponding quadrilaterals are used to determine which pixels are horizontally warped and vertically warped.

18. The method of claim 13, further including:
- implementing decimation and interpolation operations to warp the input image and to warp the first warped image; and
- implementing separate polyphase filters for the decimation and interpolation operations.

* * * * *